United States Patent
Mukae

(10) Patent No.: US 12,195,208 B2
(45) Date of Patent: Jan. 14, 2025

(54) SPACE TRAFFIC MANAGEMENT SYSTEM, SPACE TRAFFIC MANAGEMENT DEVICE, SPACE TRAFFIC MANAGEMENT METHOD, COLLISION AVOIDANCE ASSISTANCE BUSINESS DEVICE, MEGA-CONSTELLATION BUSINESS DEVICE, SPACE OBJECT BUSINESS DEVICE, SPACE SITUATIONAL AWARENESS BUSINESS DEVICE, AND OADR

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 140 days.

(21) Appl. No.: 17/917,561

(22) PCT Filed: May 7, 2021

(86) PCT No.: PCT/JP2021/017581
§ 371 (c)(1),
(2) Date: Oct. 7, 2022

(87) PCT Pub. No.: WO2021/230167
PCT Pub. Date: Nov. 18, 2021

(65) Prior Publication Data
US 2023/0143771 A1    May 11, 2023

(30) Foreign Application Priority Data
May 12, 2020  (JP) .................. 2020-084112

(51) Int. Cl.
*B64G 3/00*    (2006.01)
*B64G 1/10*    (2006.01)
*B64G 1/24*    (2006.01)

(52) U.S. Cl.
CPC ............. *B64G 3/00* (2013.01); *B64G 1/1085* (2013.01); *B64G 1/242* (2013.01)

(58) Field of Classification Search
CPC ....................................................... B64G 3/00
See application file for complete search history.

(56) References Cited

U.S. PATENT DOCUMENTS 10,829,249 B2 * 11/2020 Amimoto ............... B64G 1/242
11,040,786 B2 *  6/2021 Kaen .................... B64G 1/1085
(Continued)

FOREIGN PATENT DOCUMENTS

JP    2017-114159 A    6/2017

OTHER PUBLICATIONS

International Search Report and Written Opinion mailed on Jul. 20, 2021, received for PCT Application PCT/JP2021/017581, filed on May 7, 2021, 9 pages including English Translation.

*Primary Examiner* — Michael A Berns
(74) *Attorney, Agent, or Firm* — XSENSUS LLP

(57) ABSTRACT

An orbit analysis unit (431) of a collision avoidance assistance business device analyzes an orbit of a specific space object. When it is foreseen that the specific space object will intrude into an orbital altitude region where a satellite group of a satellite constellation flies, a notification unit (432) of the collision avoidance assistance business device notifies a satellite constellation business operator of an intrusion alert and non-public orbit information of the specific space object via a communication line that is kept secret. A collision analysis unit (411) of a satellite constellation business device analyzes a collision between the specific space object and an individual satellite in the satellite group of the satellite constellation. A countermeasure planning unit (412) of the satellite constellation business device plans a collision avoidance countermeasure when a collision is foreseen.

17 Claims, 20 Drawing Sheets

(56) References Cited

U.S. PATENT DOCUMENTS

| | | | |
|---|---|---|---|
| 11,878,817 B2* | 1/2024 | Mukae | B64G 1/1021 |
| 2018/0370658 A1 | 12/2018 | Amimoto et al. | |
| 2022/0327906 A1* | 10/2022 | Mukae | G08B 21/18 |
| 2022/0371755 A1* | 11/2022 | Mukae | G06N 20/00 |
| 2022/0380068 A1* | 12/2022 | Mukae | B64G 3/00 |
| 2023/0010570 A1* | 1/2023 | Mukae | B64G 1/1085 |
| 2023/0080986 A1* | 3/2023 | Mukae | H04B 7/18519 |
| | | | 244/158.4 |
| 2023/0137948 A1* | 5/2023 | Mukae | B64G 1/1085 |
| | | | 701/13 |
| 2023/0143280 A1* | 5/2023 | Mukae | B64G 1/242 |
| | | | 244/158.4 |
| 2023/0143771 A1* | 5/2023 | Mukae | B64G 3/00 |
| | | | 701/13 |
| 2023/0339627 A1* | 10/2023 | Mukae | B64G 1/1085 |
| 2024/0150045 A1* | 5/2024 | Stricklan | G06T 7/70 |

* cited by examiner

Fig. 10

| SATELLITE ID | DEBRIS ID | 511: SPACE OBJECT ID | 31: ORBIT FORECAST INFORMATION | | | | | | | | 514: FORECAST ERROR | | |
|---|---|---|---|---|---|---|---|---|---|---|---|---|---|
| | | | 512: FORECAST EPOCH | 513: FORECAST ORBITAL ELEMENTS (SIX KEPLERIAN ELEMENTS) | | | | | | | PREDICTED ERROR | | |
| | | | EPOCH | MEAN MOTION | ECCENTRICITY | INCLINATION | RAAN | ARGUMENT OF PERIGEE | MEAN ANOMALY | TRAVELING DIRECTION | ORTHOGONAL DIRECTION | BASIS | |
| | | | Year and date | Orbits/day | No unit | deg | deg | deg | deg | km | km | | |
| A | | | a1 | a2 | a3 | a4 | a5 | a6 | a7 | a8 | a9 | IN-ORBIT MEASUREMENT | |
| B | | | b1 | b2 | b3 | b4 | b5 | b6 | b7 | b8 | b9 | IN-ORBIT MEASUREMENT | |
| C | | | c1 | c2 | c3 | c4 | c5 | c6 | c7 | c8 | c9 | ANALYSIS | |
| D | | | d1 | d2 | d3 | d4 | d5 | d6 | d7 | d8 | d9 | GROUND MEASUREMENT | 52: SATELLITE ORBIT FORECAST INFORMATION |
| E | | | e1 | e2 | e3 | e4 | e5 | e6 | e7 | e8 | e9 | GROUND MEASUREMENT | |
| F | | | f1 | f2 | f3 | f4 | f5 | f6 | f7 | f8 | f9 | SSA MEASUREMENT | |
| | A | | α1 | α2 | α3 | α4 | α5 | α6 | α7 | α8 | α9 | SSA MEASUREMENT | |
| | B | | β1 | β2 | β3 | β4 | β5 | β6 | β7 | β8 | β9 | SSA MEASUREMENT | 53: DEBRIS ORBIT FORECAST INFORMATION |
| | Γ | | γ1 | γ2 | γ3 | γ4 | γ5 | γ6 | γ7 | γ8 | γ9 | SSA MEASUREMENT | |
| | Δ | | δ1 | δ2 | δ3 | δ4 | δ5 | δ6 | δ7 | δ8 | δ9 | SSA MEASUREMENT | |

Fig. 12

EXAMPLE OF SPACE INFORMATION RECORDER 101 OF MEGA-CONSTELLATION BUSINESS DEVICE 41

SPACE INFORMATION RECORDER 101

| SATELLITE GROUP ID | PUBLIC ORBIT INFORMATION 61 | | |
|---|---|---|---|
| | CONSTITUENT SATELLITE INFORMATION (TOTAL NUMBER, ID) | ORBITAL ALTITUDE UPPER/LOWER LIMITS | ORBITAL INCLINATION UPPER/LOWER LIMITS |

| SATELLITE ID | REAL-TIME HIGH-PRECISION ORBIT INFORMATION 63 |
|---|---|
| | FORECAST ORBIT INFORMATION |

| EPOCH | ORBITAL ELEMENTS | PREDICTED ERROR | LATITUDE ANGLE ERROR | LONGITUDE ANGLE ERROR | INFORMATION PROVIDER BUSINESS DEVICE ID | INFORMATION UPDATE DATE |
|---|---|---|---|---|---|---|
| TIME ERROR | ORBIT RADIUS ERROR | | | | | VERIFICATION RECORD |

RECORD ORBIT INFORMATION

| UTS TIME | LOCATION COORDINATES | MEASUREMENT ERROR | LATITUDE ANGLE ERROR | LONGITUDE ANGLE ERROR | INFORMATION PROVIDER BUSINESS DEVICE ID | INFORMATION UPDATE DATE |
|---|---|---|---|---|---|---|
| TIME ERROR | ORBIT RADIUS ERROR | | | | | MEASUREMENT MEANS |

Fig. 17

EXAMPLE OF FORECAST ORBIT INFORMATION 64 IN SPACE INFORMATION RECORDER 101 INCLUDED IN EACH OF MEGA-CONSTELLATION BUSINESS DEVICE 43

FORECAST ORBIT INFORMATION 64

REPRESENTATIVE SATELLITES 311 QUASI-REAL-TIME HIGH-PRECISION ORBIT INFORMATION 641

| SATELLITE ID | EPOCH | ORBITAL ELEMENTS | PREDICTED ERROR | INFORMATION PROVIDER BUSINESS DEVICE ID | INFORMATION UPDATE DATE |
|---|---|---|---|---|---|
| | | | | | |
| | | | | | |

CONSTITUENT SATELLITES 321 ORBIT INFORMATION RELATIVE VALUES 642

| SATELLITE ID | REFERENCE REPRESENTATIVE SATELLITE ID | ORBITAL PLANE RELATIVE AZIMUTH ANGLE | RELATIVE ELEVATION ANGLE WITHIN ORBITAL PLANE | RELATIVE ELEVATION ANGLE BETWEEN ORBITAL PLANES |
|---|---|---|---|---|
| | | | | |
| | | | | | ized.

SPACE TRAFFIC MANAGEMENT SYSTEM, SPACE TRAFFIC MANAGEMENT DEVICE, SPACE TRAFFIC MANAGEMENT METHOD, COLLISION AVOIDANCE ASSISTANCE BUSINESS DEVICE, MEGA-CONSTELLATION BUSINESS DEVICE, SPACE OBJECT BUSINESS DEVICE, SPACE SITUATIONAL AWARENESS BUSINESS DEVICE, AND OADR

CROSS-REFERENCE TO RELATED APPLICATIONS

The present application is based on PCT filing PCT/JP2021/017581, filed May 7, 2021, which claims priority to JP 2020-084112, filed May 12, 2020, the entire contents of each are incorporated herein by reference.

TECHNICAL FIELD

The present disclosure relates to a space traffic management system, a space traffic management device, a space traffic management method, a collision avoidance assistance business device, a satellite constellation business device, a mega-constellation business device, a space object business device, a space situational awareness business device, and an OADR.

BACKGROUND ART

In recent years, large-scale satellite constellations including several hundred to several thousand satellites, which are called mega-constellations, have started to be constructed, and the risk of collision between satellites in orbit is increasing. In addition, space debris such as an artificial satellite that has become uncontrollable due to a failure or rocket debris has been increasing.

With the rapid increase in space objects such as satellites and space debris in outer space as described above, in space traffic management (STM) there is an increasing need to create international rules for avoiding collisions between space objects.

Patent Literature 1 discloses a technology for forming a satellite constellation composed of a plurality of satellites in the same circular orbit.

There is so far a system in which the Combined Space Operations Center (CSpOC) in the United States continues to monitor space objects and issues an alert when a proximity or collision between space objects is foreseen. At a manned space station and in a commercial communications satellite, an avoidance operation is carried out in response to this alert when it is judged necessary. However, a plan to transfer the system to issue alerts for private satellites to a private business operator has recently been announced in the United States, and a new system is needed.

CITATION LIST

Patent Literature

Patent Literature 1: JP 2017-114159 A

SUMMARY OF INVENTION

Technical Problem

Satellites orbiting Earth includes a satellite whose orbit information is not appropriate to be disclosed or whose orbit information is kept secret. Such a satellite also has a risk of approaching and colliding with an individual satellite in a mega-constellation satellite group for which it is difficult to disclose high-precision orbit information in real time. A problem is that there is no scheme in which a collision can be foreseen without using public information in a satellite whose orbit information is not appropriate to be disclosed and an individual satellite in a mega-constellation satellite group, so that collision avoidance cannot be performed.

Patent Literature 1 does not describe a scheme for avoiding a collision between a satellite whose orbit information is not appropriate to be disclosed and an individual satellite in a mega-constellation satellite group.

An object of the present disclosure is to avoid a collision between a satellite whose orbit information is not appropriate to be disclosed and an individual satellite in a mega-constellation satellite group.

Solution to Problem

A space traffic management system according to the present disclosure is a system in which space traffic management devices installed respectively in a space object business device that manages a specific space object, a collision avoidance assistance business device that assists avoidance of a collision between space objects in outer space, and a satellite constellation business device that manages a satellite constellation composed of a plurality of satellites are connected with a communication line that is kept secret with a common cryptographic key, each of the space traffic management devices including a database and a server,
  wherein the database included in the space traffic management device of the collision avoidance assistance business device records non-public orbit information of the specific space object that is received from the space object business device via the communication line that is kept secret and orbit information or flight region information of a satellite group of a satellite constellation that is acquired from the satellite constellation business device,
  wherein the server included in the space traffic management device of the collision avoidance assistance business device includes
  an orbit analysis unit to analyze an orbit of the specific space object, and
  a notification unit to, when it is foreseen that the specific space object will intrude into an orbital altitude region where the satellite group of the satellite constellation flies, notify a satellite constellation business operator of an intrusion alert and the non-public orbit information of the specific space object via the communication line that is kept secret, and
  wherein the server included in the space traffic management device of the satellite constellation business device includes
  a collision analysis unit to analyze a collision between the specific space object and an individual satellite in the satellite group of the satellite constellation, and
  a countermeasure planning unit to plan a collision avoidance countermeasure when a collision is foreseen.

Advantageous Effects of Invention

A space traffic management system according to the present disclosure can provide assistance to avoid a collision between a specific space object whose orbit information is

BRIEF DESCRIPTION OF DRAWINGS

FIG. 10 is a diagram illustrating an example of orbit forecast information according to Embodiment 1;

FIG. 12 is an example of a space information recorder of a mega-constellation business device according to Embodiment 1;

FIG. 17 is a detailed configuration diagram of forecast orbit information according to Embodiment 2;

DESCRIPTION OF EMBODIMENTS

Figure 1:
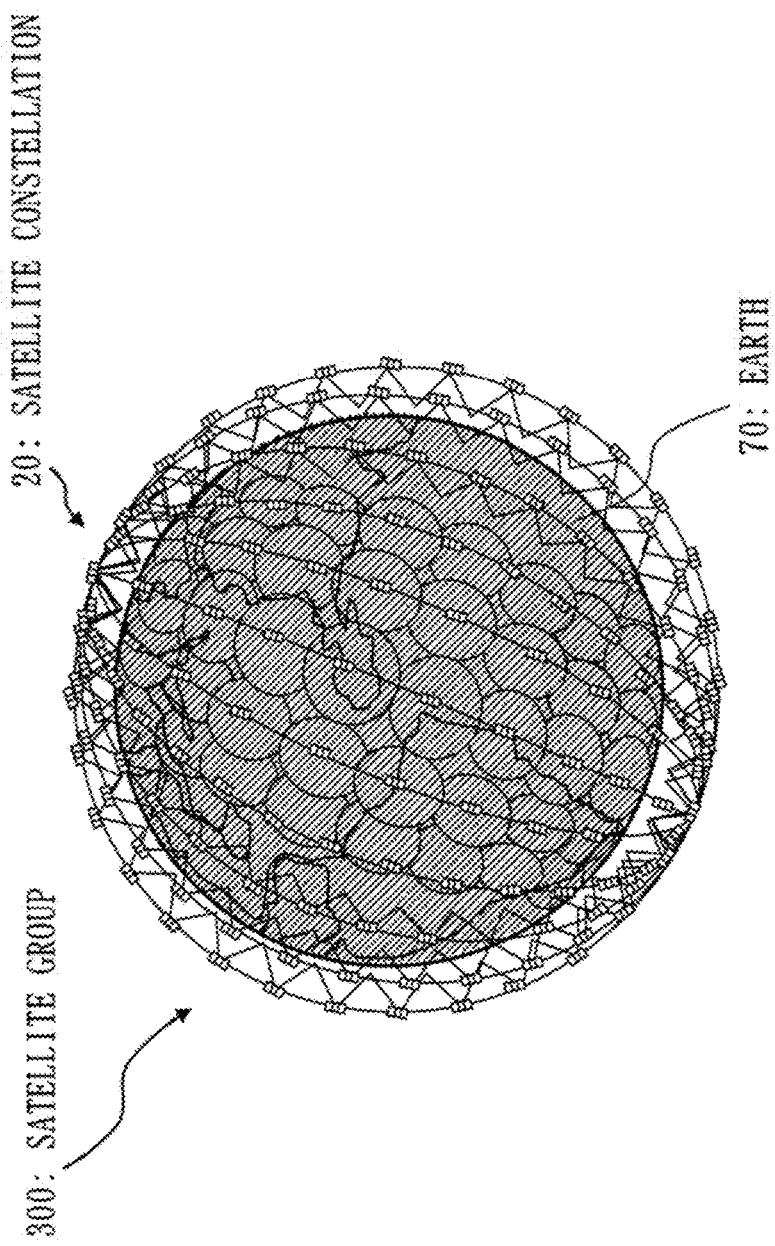
FIG. 1 is an example in which a plurality of satellites cooperatively realize a communication service to the ground over the entire globe of Earth.

Embodiments of the present disclosure will be described hereinafter with reference to the drawings. Throughout the drawings, the same or corresponding parts are denoted by the same reference signs. In the description of the embodiments, description of the same or corresponding parts will be suitably omitted or simplified. In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

Examples of a satellite constellation assumed for a space traffic management system according to the following embodiments will be described.

FIG. 1 is a diagram illustrating an example in which a plurality of satellites cooperatively realize a communication service to the ground over the entire globe of Earth 70.

FIG. 1 illustrates a satellite constellation 20 that realizes a communication service over the entire globe.

The ground communication service range of each satellite of a plurality of satellites flying at the same altitude in the same orbital plane overlaps the communication service range of a following satellite. Therefore, with such satellites, the satellites in the same orbital plane can provide a communication service to a specific point on the ground in turn in a time-division manner. By providing adjacent orbital planes, a communication service can be provided to the ground with widespread coverage across the adjacent orbits. Similarly, by placing a large number of orbital planes at approximately equal intervals around Earth, a communication service to the ground can be provided over the entire globe.

Figure 2:
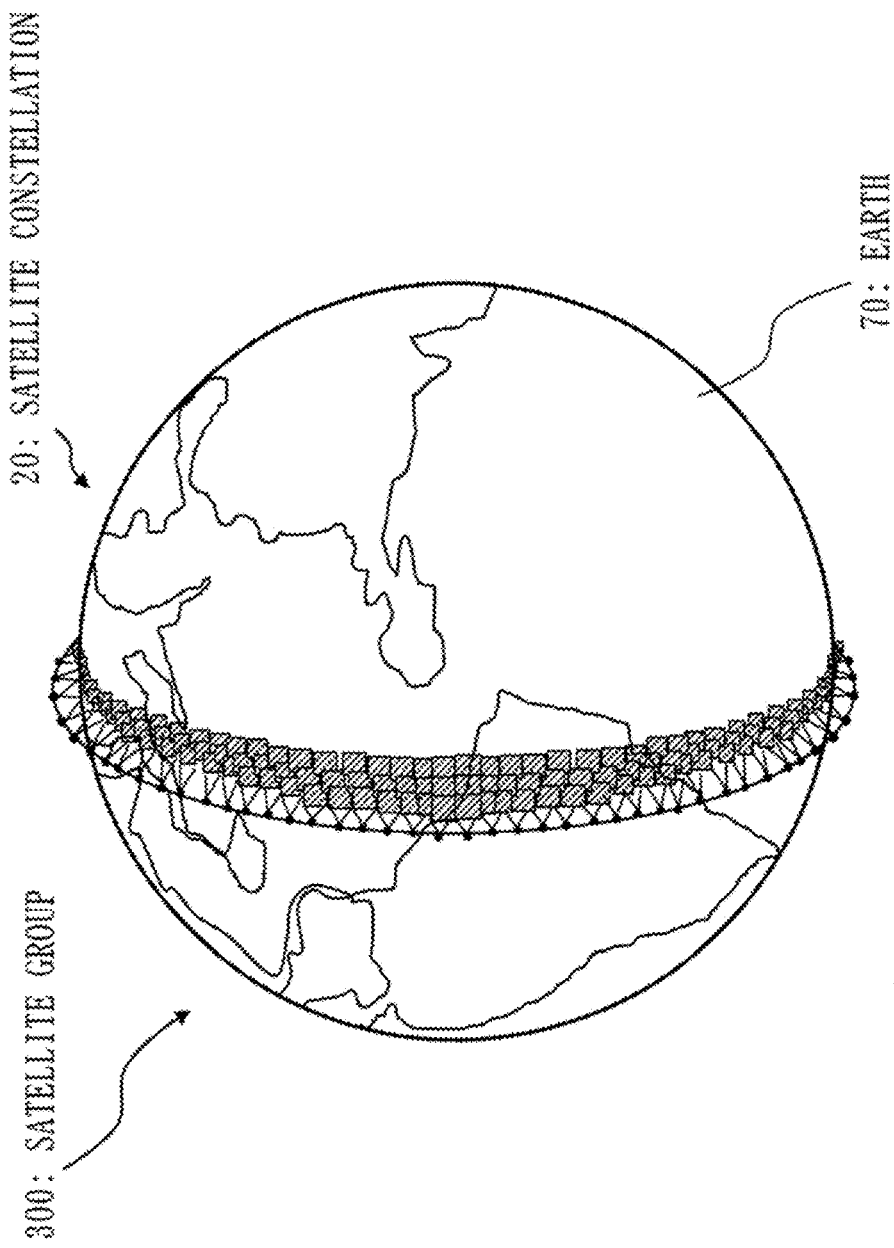
FIG. 2 is an example in which a plurality of satellites in a single orbital plane realize an Earth observation service.

FIG. 2 is a diagram illustrating an example in which a plurality of satellites in a single orbital plane realize an Earth observation service.

FIG. 2 illustrates a satellite constellation 20 that realizes an Earth observation service. In the satellite constellation 20 of FIG. 2, satellites each equipped with an Earth observation device, which is an optical sensor or a radio sensor such as a synthetic-aperture radar, fly at the same altitude in the same orbital plane. In this way, in a satellite group 300 in which the ground imaging ranges of successive satellites overlap in a time-delay manner, a plurality of satellites in orbit provide an Earth observation service by capturing ground images in turn in a time-division manner.

As described above, the satellite constellation 20 is formed with the satellite group 300 composed of a plurality of satellites in each orbital plane. In the satellite constellation 20, the satellite group 300 cooperatively provides a service. Specifically, the satellite constellation 20 refers to a satellite constellation formed with one satellite group by a communications business service company as illustrated in FIG. 1 or an observation business service company as illustrated in FIG. 2.

Figure 3:
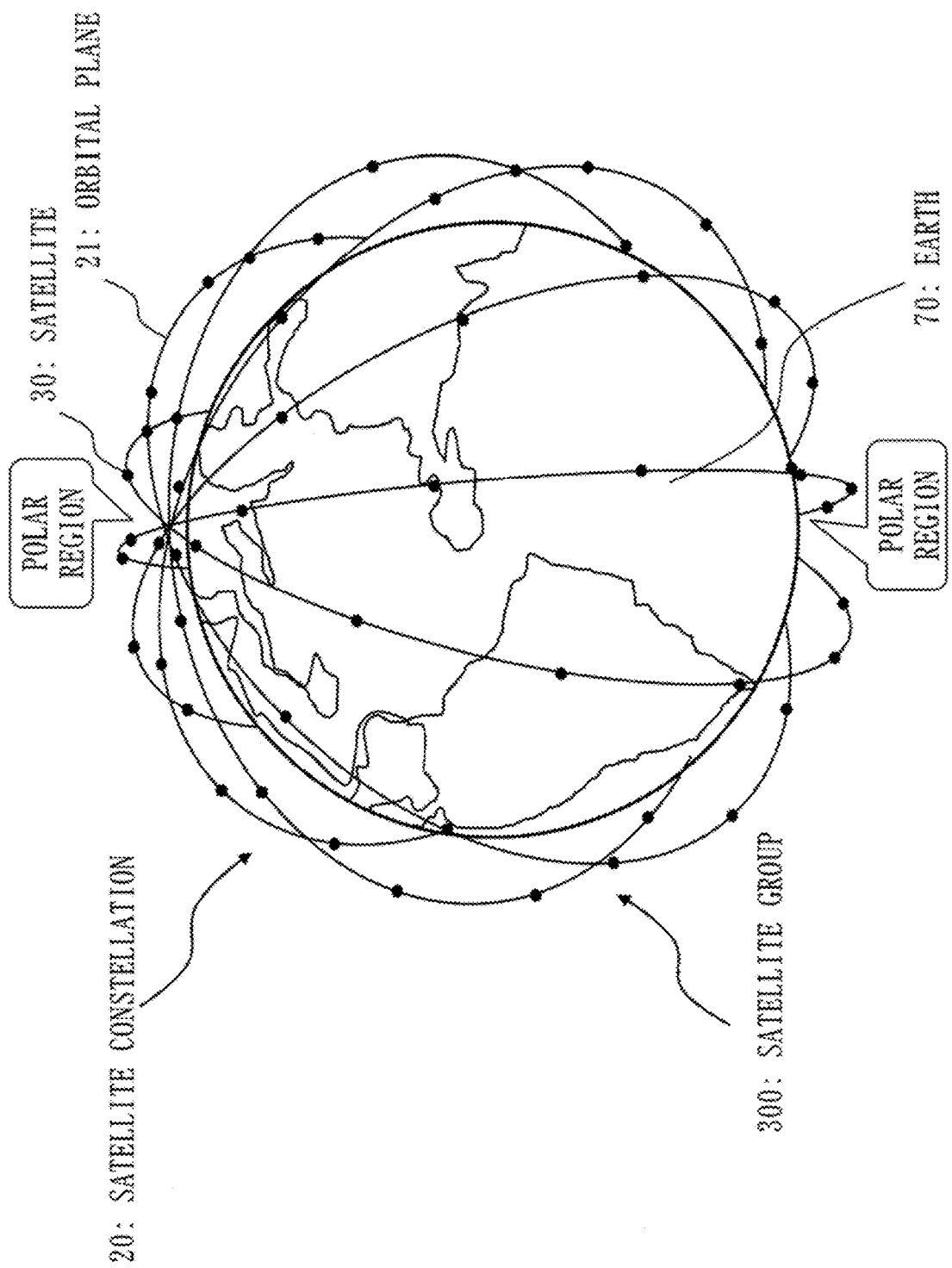
FIG. 3 is an example of a satellite constellation having a plurality of orbital planes that intersect in the vicinity of the polar regions.
Figure 4:
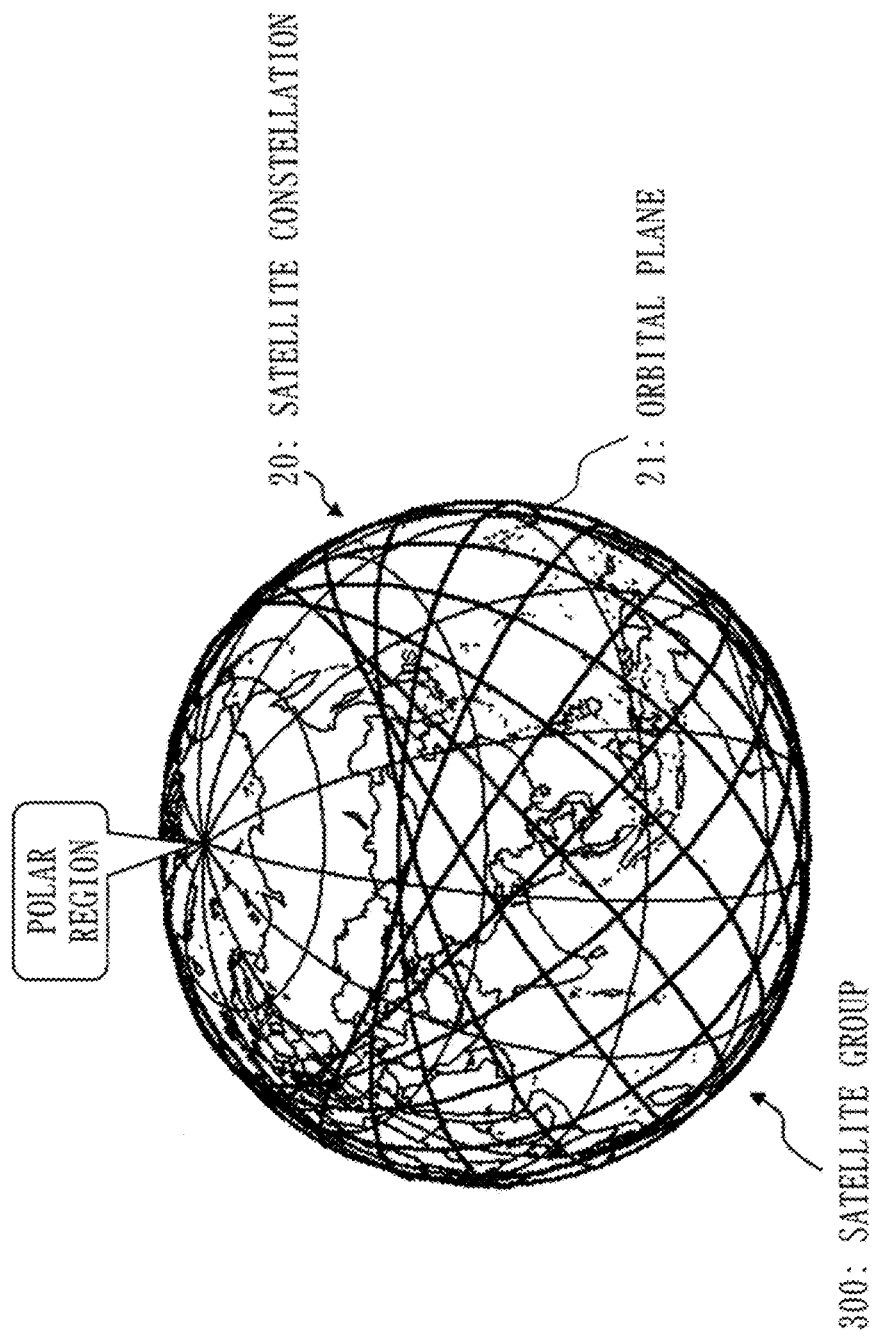
FIG. 4 is an example of a satellite constellation having a plurality of orbital planes that intersect outside the polar regions.

FIG. 3 is an example of a satellite constellation 20 having a plurality of orbital planes 21 that intersect in the vicinity of the polar regions. FIG. 4 is an example of a satellite constellation 20 having a plurality of orbital planes 21 that intersect outside the polar regions.

In the satellite constellation 20 of FIG. 3, the orbital inclination of each of the plurality of orbital planes 21 is about 90 degrees, and the orbital planes 21 exist on mutually different planes.

In the satellite constellation 20 of FIG. 4, the orbital inclination of each of the plurality of orbital planes 21 is not about 90 degrees, and the orbital planes 21 exist on mutually different planes.

In the satellite constellation 20 of FIG. 3, any given two orbital planes intersect at points in the vicinity of the polar regions. In the satellite constellation 20 of FIG. 4, any given two orbital planes intersect at points outside the polar regions. In FIG. 3, a collision between satellites 30 may occur in the vicinity of the polar regions. As illustrated in FIG. 4, the intersections between the orbital planes each with an orbital inclination greater than 90 degrees move away from the polar regions according to the orbital inclination. Depending on the combinations of orbital planes, orbital planes may intersect at various locations including the vicinity of the equator. For this reason, places where collisions between satellites 30 may occur are diversified. A satellite 30 is referred to also as an artificial satellite.

In particular, in recent years, large-scale satellite constellations including several hundred to several thousand satellites have started to be constructed, and the risk of collision between satellites in orbit is increasing. In addition, space debris such as an artificial satellite that has become uncontrollable due to a failure or rocket debris has been increasing. A large-scale satellite constellation is referred to also as a mega-constellation. Such debris is referred to also as space debris.

As described above, with the increase in debris in outer space and the rapid increase in the number of satellites such as those in a mega-constellation, the need for space traffic management (STM) is increasing.

For an orbital transfer of a space object, there is an increasing need for deorbit after completion of a mission in orbit (PMD) or ADR, which causes debris such as a failed satellite or an upper stage of a rocket that is floating to deorbit by external means such as a debris retrieval satellite. International discussions have begun as STM on the need for such ADR. PMD is an abbreviation for Post Mission Disposal. ADR is an abbreviation for Active Debris Removal.

There is a specific space object which includes a satellite whose orbit information is not appropriate to be disclosed or whose orbit information is kept secret. It is difficult for a satellite group constituting a mega-constellation to disclose high-precision orbit information in real time. Therefore, there is a risk of proximity and collision between such a specific space object and an individual satellite in a mega-constellation satellite group.

In this embodiment, a scheme for avoiding a collision between a specific space object whose orbit information is not appropriate to be disclosed and an individual satellite in a mega-constellation satellite group will be described.

Referring to FIGS. 5 to 8, an example of a satellite 30 and a ground facility 700 in a satellite constellation forming system 600 that forms a satellite constellation 20 will be described. For example, the satellite constellation forming system 600 is operated by a business operator that conducts a satellite constellation business, such as a mega-constellation business device 41, an LEO constellation business device, or a satellite business device.

Figure 5:
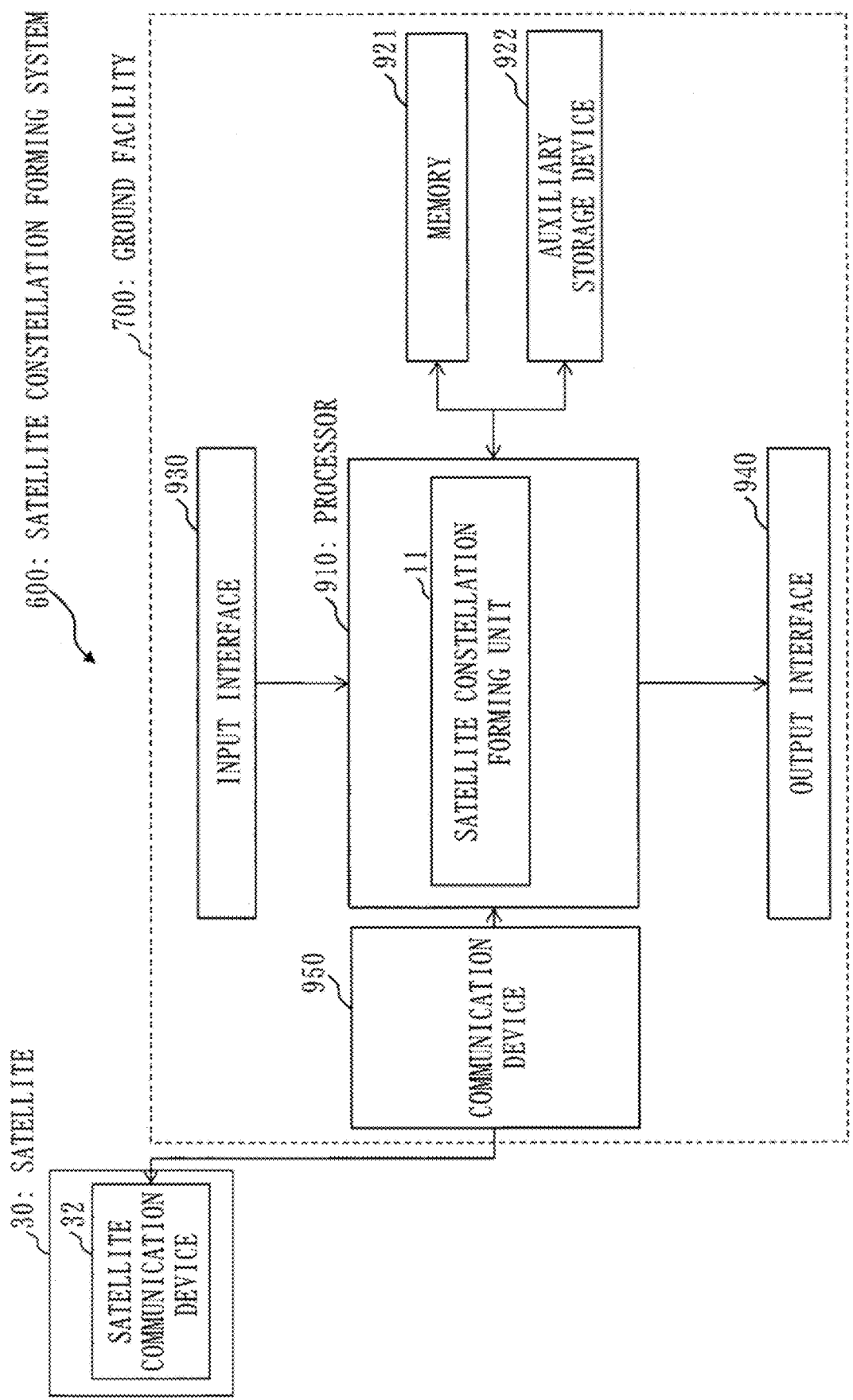
FIG. 5 is a configuration diagram of a satellite constellation forming system.

FIG. 5 is a configuration diagram of the satellite constellation forming system 600.

The satellite constellation forming system 600 includes a computer. FIG. 5 illustrates a configuration with one computer but, in practice, a computer is provided in each satellite 30 of a plurality of satellites constituting the satellite constellation 20 and the ground facility 700 that communicates with each satellite 30. The functions of the satellite constellation forming system 600 are realized cooperatively by the computers provided in each of the satellites 30 and the ground facility 700 that communicates with the satellites 30. In the following, an example of a configuration of the computer that realizes the functions of the satellite constellation forming system 600 will be described.

The satellite constellation forming system 600 includes the satellite 30 and the ground facility 700. The satellite 30 includes a satellite communication device 32 that communicates with a communication device 950 of the ground facility 700. Among the components included in the satellite 30, the satellite communication device 32 is illustrated in FIG. 5.

The satellite constellation forming system 600 includes a processor 910, and also includes other hardware components such as a memory 921, an auxiliary storage device 922, an input interface 930, an output interface 940, and a communication device 950. The processor 910 is connected with other hardware components via signal lines and controls these other hardware components. The hardware of the satellite constellation forming system 600 is substantially the same as the hardware of a space traffic management device 100 to be described later with reference to FIG. 9.

The satellite constellation forming system 600 includes a satellite constellation forming unit 11 as a functional element. The functions of the satellite constellation forming unit 11 are realized by hardware or software.

The satellite constellation forming unit 11 controls formation of the satellite constellation 20 while communicating with the satellite 30.

Figure 6:
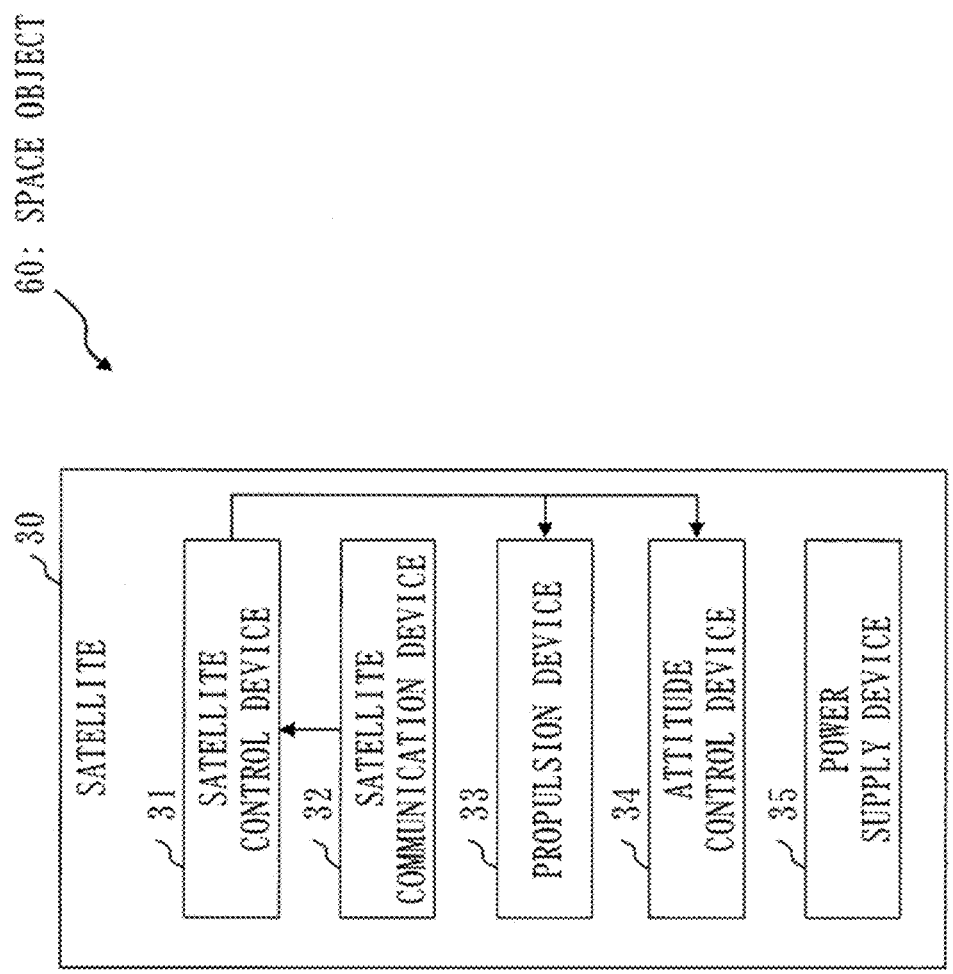
FIG. 6 is a configuration diagram of a satellite of the satellite constellation forming system.

FIG. 6 is a configuration diagram of the satellite 30 of the satellite constellation forming system 600.

The satellite 30 includes a satellite control device 31, the satellite communication device 32, a propulsion device 33, an attitude control device 34, and a power supply device 35. Although other constituent elements that realize various functions are included, the satellite control device 31, the satellite communication device 32, the propulsion device 33, the attitude control device 34, and the power supply device 35 will be described in FIG. 6. The satellite 30 is an example of a space object 60.

The satellite control device 31 is a computer that controls the propulsion device 33 and the attitude control device 34 and includes a processing circuit. Specifically, the satellite control device 31 controls the propulsion device 33 and the attitude control device 34 in accordance with various commands transmitted from the ground facility 700.

The satellite communication device 32 is a device that communicates with the ground facility 700. Specifically, the satellite communication device 32 transmits various types of data related to the satellite itself to the ground facility 700. The satellite communication device 32 also receives various commands transmitted from the ground facility 700.

The propulsion device 33 is a device that provides thrust force to the satellite 30 to change the velocity of the satellite 30. Specifically, the propulsion device 33 is a chemical propulsion device or an electronic propulsion device.

The chemical propulsion device is a thruster using monopropellant or bipropellant fuel. The electronic propulsion device is an ion engine or a Hall thruster.

The attitude control device 34 is a device to control the attitude of the satellite 30 and attitude elements, such as the angular velocity and the line of sight, of the satellite 30. The attitude control device 34 changes the orientation of each attitude element to a desired orientation. Alternatively, the attitude control device 34 maintains each attitude element in a desired orientation. The attitude control device 34 includes an attitude sensor, an actuator, and a controller. The attitude sensor is a device such as a gyroscope, an Earth sensor, a sun sensor, a star tracker, a thruster, or a magnetic sensor. The actuator is a device such as an attitude control thruster, a momentum wheel, a reaction wheel, or a control moment gyroscope. The controller controls the actuator in accordance with measurement data of the attitude sensor or various commands from the ground facility 700.

The power supply device 35 includes equipment such as a solar cell, a battery, and an electric power control device, and provides electric power to each piece of equipment installed in the satellite 30.

The processing circuit included in the satellite control device 31 will be described.

The processing circuit may be dedicated hardware, or may be a processor that executes programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit. FPGA is an abbreviation for Field Programmable Gate Array.

Figure 7:
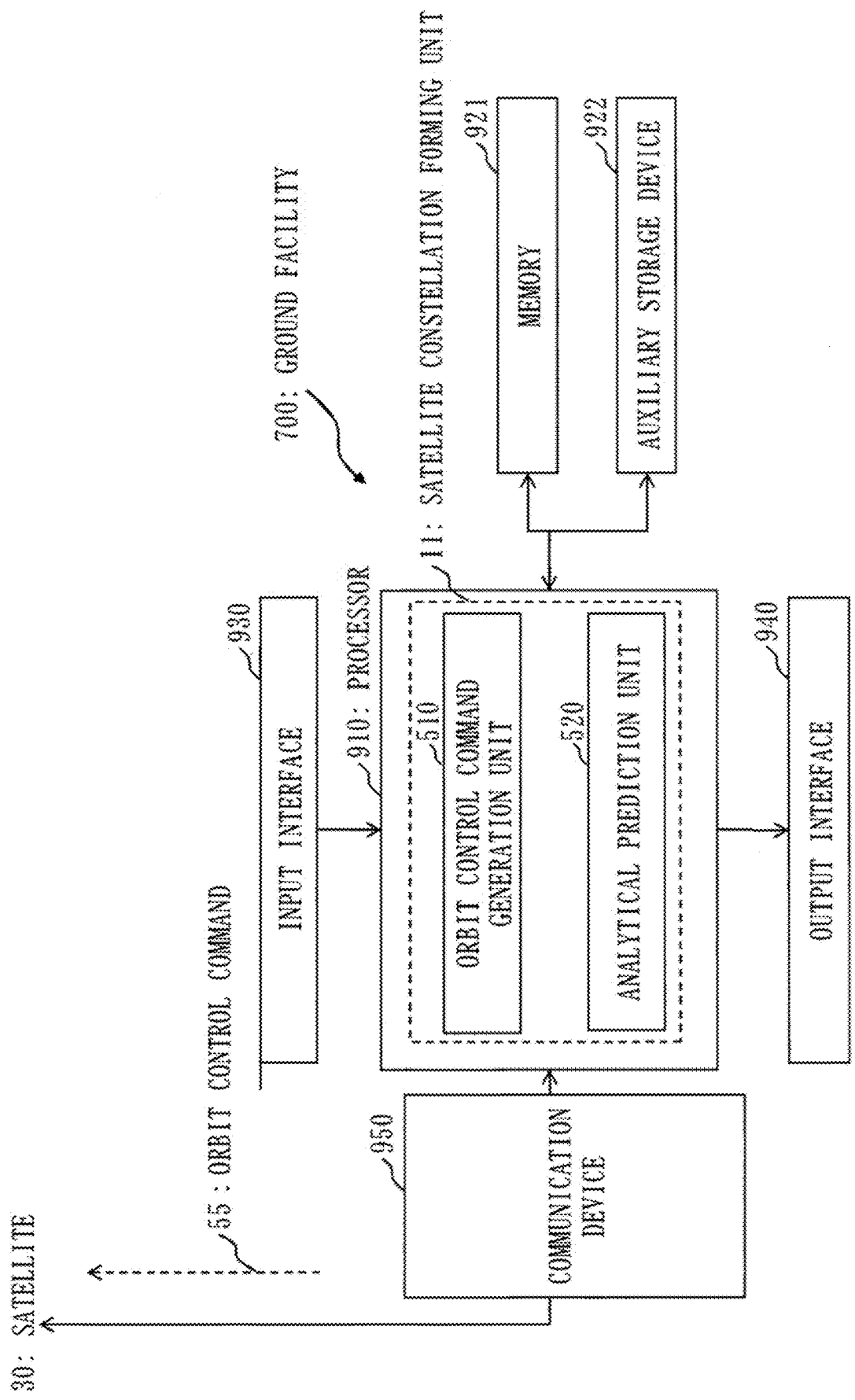
FIG. 7 is a configuration diagram of a ground facility of the satellite constellation forming system.

FIG. 7 is a configuration diagram of the ground facility 700 included in the satellite constellation forming system 600.

The ground facility 700 controls a large number of satellites in all orbital planes by programs. The ground facility 700 is an example of a ground device. The ground device is composed of a ground station, such as a ground antenna device, a communication device connected to a ground antenna device, or an electronic computer, and a ground facility as a server or terminal connected with the ground station via a network. The ground device may include a communication device installed in a mobile object such as an airplane, a self-driving vehicle, or a mobile terminal.

The ground facility 700 forms the satellite constellation 20 by communicating with each satellite 30. The ground facility 700 is provided in the space traffic management device 100. The ground facility 700 includes a processor 910 and also includes other hardware components such as a memory 921, an auxiliary storage device 922, an input interface 930, an output interface 940, and a communication device 950. The processor 910 is connected with other hardware components via signal lines and controls these other hardware components. The hardware components of the ground facility 700 is substantially the same as the hardware components of the space traffic management device 100 to be described later with reference to FIG. 9.

The ground facility 700 includes an orbit control command generation unit 510 and an analytical prediction unit 520 as functional elements. The functions of the orbit control command generation unit 510 and the analytical prediction unit 520 are realized by hardware or software.

The communication device 950 transmits and receives signals for tracking and controlling each satellite 30 in the satellite group 300 constituting the satellite constellation 20. The communication device 950 transmits an orbit control command 55 to each satellite 30.

The analytical prediction unit 520 performs analytical prediction on the orbit of the satellite 30.

The orbit control command generation unit 510 generates an orbit control command 55 to be transmitted to the satellite 30.

The orbit control command generation unit 510 and the analytical prediction unit 520 realize the functions of the satellite constellation forming unit 11. That is, the orbit control command generation unit 510 and the analytical prediction unit 520 are examples of the satellite constellation forming unit 11.

Figure 8:
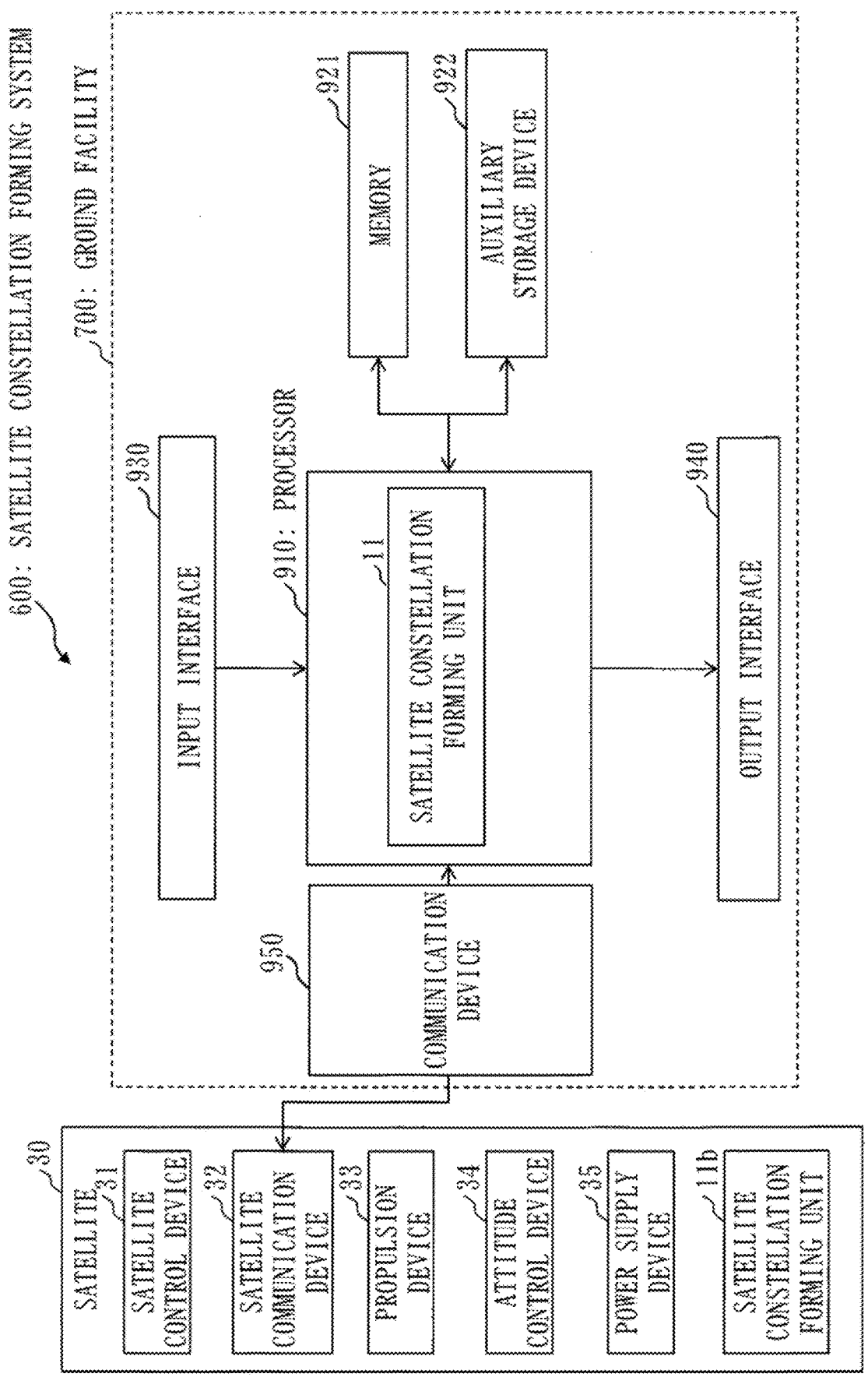
FIG. 8 is an example of a functional configuration of the satellite constellation forming system.

FIG. 8 is a diagram illustrating an example of a functional configuration of the satellite constellation forming system 600.

The satellite 30 further includes a satellite constellation forming unit 11b to form the satellite constellation 20. The functions of the satellite constellation forming system 600 are realized cooperatively by the satellite constellation forming unit 11b included in each satellite 30 of a plurality of satellites and the satellite constellation forming unit 11 included in the ground facility 700. The satellite constellation forming unit 11b of the satellite 30 may be included in the satellite control device 31.

Description of Configurations

A space traffic management system 500 according to this embodiment is a system aimed at avoiding a collision between a specific space object whose orbit information is not appropriate to be disclosed and a satellite in a mega-constellation satellite group.

The specific space object whose orbit information is not appropriate to be disclosed is, for example, a satellite whose orbit information is not appropriate to be disclosed or a satellite whose orbit information is kept secret.

Figure 9:
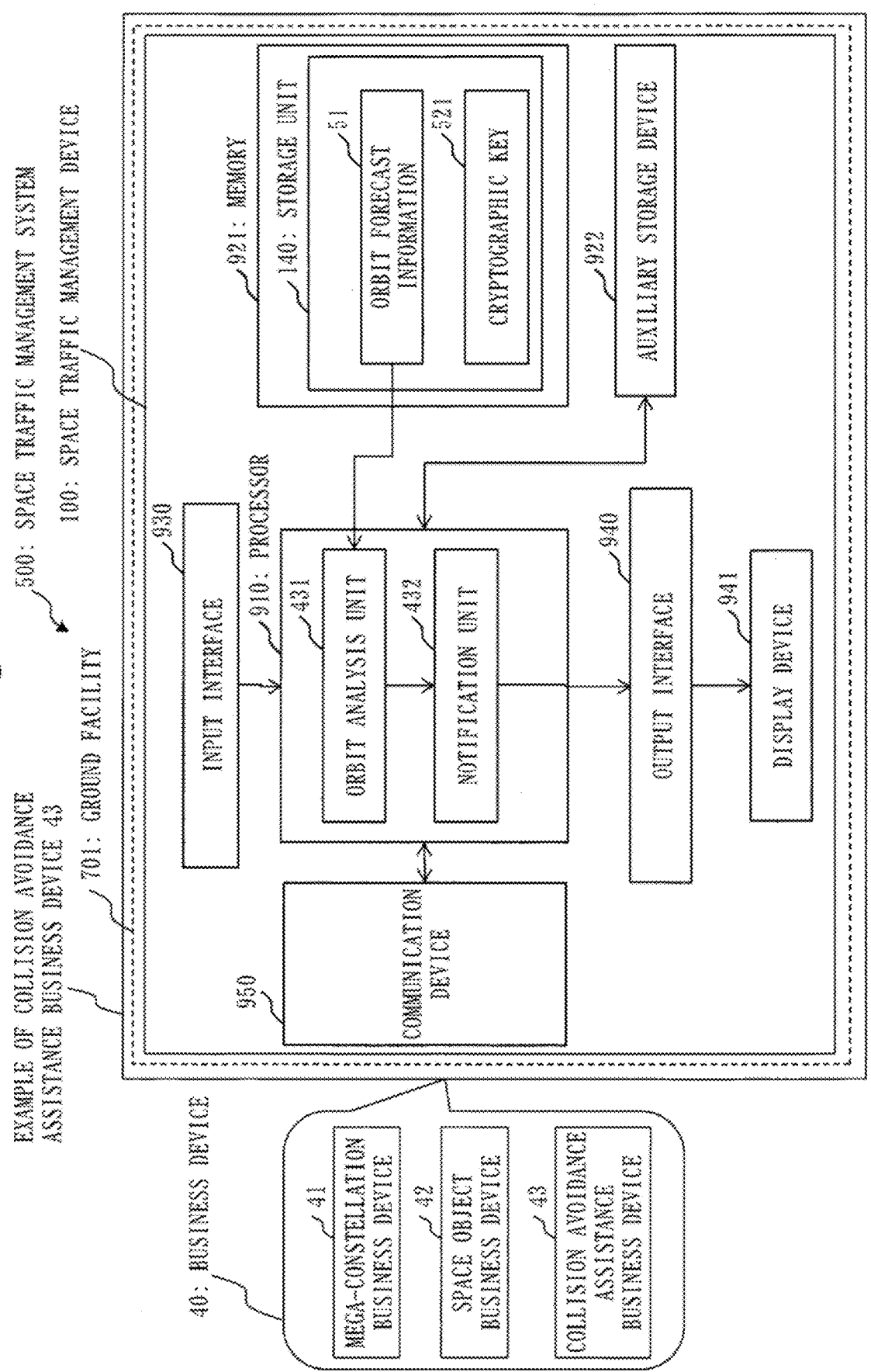
FIG. 9 is an example of a hardware configuration of a space traffic management device according to Embodiment 1.

FIG. 9 is a diagram illustrating an example of a hardware configuration of the space traffic management device 100 according to this embodiment.

The space traffic management device 100 is installed in each of business devices 40 of management business operators that manage space objects flying in space.

Specifically, the space traffic management device 100 is installed in each of the mega-constellation business device 41, a space object business device 42, and a collision avoidance assistance business device 43.

The mega-constellation business device 41 manages a satellite constellation composed of a plurality of satellites. Specifically, the mega-constellation business device 41 is a computer of a mega-constellation business operator that conducts a large-scale satellite constellation, that is, mega-constellation business. The mega-constellation business device 41 is an example of a satellite constellation business device that manages, for example, a satellite constellation composed of 100 or more satellites. The satellite constellation composed of 100 or more satellites is referred to also as a mega-constellation.

The space object business device 42 manages a specific space object S. Specifically, the space object business device 42 is a computer of a space object business operator that manages the specific space object S. The specific space object S is, for example, a space object whose orbit information is not appropriate to be disclosed or whose orbit information is kept secret.

The collision avoidance assistance business device 43 assists avoidance of a collision between space objects in outer space. Specifically, the collision avoidance assistance business device 43 is a computer of a collision avoidance business operator that assists avoidance of a collision between space objects in outer space.

The space traffic management device 100 is installed in each of the mega-constellation business device 41, the space object business device 42, and the collision avoidance assistance business device 43, and includes a database and a server. The space traffic management system 500 connects the space traffic management devices 100 installed respectively in the mega-constellation business device 41, the space object business device 42, and the collision avoidance assistance business device 43 with a secret communication line 200 that is kept secret with a common cryptographic key. The space traffic management devices 100 installed respectively in the mega-constellation business device 41, the space object business device 42, and the collision avoidance assistance business device 43 can communicate mutually via the secret communication line 200 and can also communicate via an ordinary communication line.

In addition to the mega-constellation business device 41, the space object business device 42, and the collision avoidance assistance business device 43, the business devices 40 may also include business devices such as an LEO constellation business device, a satellite business device, an orbital transfer business device, a debris removal business device, a rocket launch business device, and an SSA business device. LEO is an abbreviation for Low Earth Orbit. SSA is an abbreviation for Space Situational Awareness. The SSA business device is referred to also as a space situational awareness business device.

Each of the business devices 40 provides information related to a space object 60 such as an artificial satellite managed by each device or debris. Each of the business devices 40 is a computer of a business operator that collects information related to a space object 60 such as an artificial satellite or debris.

The LEO constellation business device is a computer of an LEO constellation business operator that conducts a low Earth orbit constellation, that is, LEO constellation business.

The satellite business device is a computer of a satellite business operator that handles one to several satellites.

The orbital transfer business device is a computer of an orbital transfer business operator that performs a space object intrusion alert for satellites.

The debris removal business device is a computer of a debris removal business operator that conducts a business to retrieve debris.

The rocket launch business device is a computer of a rocket launch business operator that conducts a rocket launch business.

The SSA business device is a computer of an SSA business operator that conducts an SSA business, that is, a space situational awareness business.

The space traffic management device 100 may be installed in a ground facility 701 included in each of the business devices 40. The space traffic management device 100 may be installed in the satellite constellation forming system 600.

The space traffic management device 100 includes a processor 910 and also includes other hardware components such as a memory 921, an auxiliary storage device 922, an input interface 930, an output interface 940, and a communication device 950. The processor 910 is connected with other hardware components via signal lines and controls these other hardware components.

The processor 910 is an example of the server. The memory 921 and the auxiliary storage device 922 are examples of the database. The server may include other hardware components such as an input interface 930, an output interface 940, a communication device 950, and a storage device. The server realizes the functions of each of the mega-constellation business device 41, the space object business device 42, and the collision avoidance assistance business device 43.

The space traffic management device 100 of the collision avoidance assistance business device 43 includes an orbit analysis unit 431, a notification unit 432, and a storage unit 140 as an example of functional elements that realize a collision avoidance assistance function. In the storage unit 140, orbit forecast information 51 and a cryptographic key 521 are stored.

The space traffic management device 100 of the mega-constellation business device 41 includes a collision analysis unit 411, a countermeasure planning unit 412, and a storage unit 140 as an example of functional elements that realize a mega-constellation management function. In the storage unit 140, the orbit forecast information 51 and the cryptographic key 521 are stored.

The space traffic management device 100 of the space object business device 42 has a function of managing the specific space object S whose orbit information is not appropriate to be disclosed or whose orbit information is kept secret.

Referring to FIG. 9, a hardware configuration of the space traffic management device 100 will be described below, using the space traffic management device 100 of the collision avoidance assistance business device 43 as an example. It is assumed that the space traffic management devices 100 of other business devices 40 also have substantially the same hardware configuration.

The functions of the orbit analysis unit 431 and the notification unit 432 are realized by software. The storage unit 140 is provided in the memory 921. Alternatively, the storage unit 140 may be provided in the auxiliary storage device 922. Alternatively, the storage unit 140 may be divided and provided in the memory 921 and the auxiliary storage device 922.

FIG. 9 will be described assuming that the space traffic management device 100 realizes the collision avoidance assistance function. However, the space traffic management device 100 has various functions other than the collision avoidance assistance function.

The processor 910 is a device that executes a space traffic management program. The space traffic management program is a program that realizes the functions of the constituent elements of the space traffic management device 100 and the space traffic management system 500.

The processor 910 is an integrated circuit (IC) that performs operational processing. Specific examples of the processor 910 are a central processing unit (CPU), a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of a display device 941, such as a display, is to be connected.

Specifically, the output interface 940 is a USB terminal or a High Definition Multimedia Interface (HDMI, registered trademark) terminal. Specifically, the display is a liquid crystal display (LCD).

The communication device 950 has a receiver and a transmitter. Specifically, the communication device 950 is a communication chip or a network interface card (NIC). In this embodiment, the space traffic management devices 100 of the mega-constellation business device 41, the space object business device 42, and the collision avoidance assistance business device 43 communicate mutually via the secret communication line 200 that is kept secret with the common cryptographic key 521. For communication that does not need to be kept secret, the communication is performed via an ordinary communication line.

The space traffic management program is read into the processor 910 and executed by the processor 910. The memory 921 stores not only the space traffic management program but also an operating system (OS). The processor 910 executes the space traffic management program while executing the OS. The space traffic management program and the OS may be stored in the auxiliary storage device 922. The space traffic management program and the OS that are stored in the auxiliary storage device 922 are loaded into the memory 921 and executed by the processor 910. Part or the entirety of the space traffic management program may be embedded in the OS.

The space traffic management device 100 may include a plurality of processors as an alternative to the processor 910. These processors share the execution of programs. Each of the processors is, like the processor 910, a device that executes programs.

Data, information, signal values, and variable values that are used, processed, or output by programs are stored in the memory 921 or the auxiliary storage device 922, or stored in a register or a cache memory in the processor 910.

"Unit" of each unit of the space traffic management device may be interpreted as "process", "procedure", "means", "phase", or "step". "Process" of an orbit analysis process and a notification process may be interpreted as "program", "program product", or "computer readable recording medium recording a program". The terms "process", "procedure", "means", "phase", and "step" may be interpreted interchangeably.

The space traffic management program causes a computer to execute each process, each procedure, each means, each phase, or each step, where "unit" of each unit of the space traffic management system is interpreted as "process", "procedure", "means", "phase", or "step". A space traffic management method is a method performed by execution of the space traffic management program by the space traffic management device 100.

The space traffic management program may be stored and provided in a computer readable recording medium. Alternatively, each program may be provided as a program product.

FIG. 10 is a diagram illustrating an example of the orbit forecast information 51 according to this embodiment.

The space traffic management device 100 stores, in the storage unit 140, the orbit forecast information 51 in which forecast values of orbits of space objects 60 are set. For example, the space traffic management device 100 may acquire forecast values of the orbit of each of the space objects 60 from the business device 40 used by a management business operator that manages the space objects 60 and store them as the orbit forecast information 51. Alternatively, the space traffic management device 100 may acquire the orbit forecast information 51 in which forecast values of the orbit of each of the space objects 60 are set from the management business operator and store it in the storage unit 140.

The management business operator is a business operator that manages the space objects 60 that fly in outer space, such as a satellite constellation, various types of satellites, a rocket, and debris. As described above, the business device 40 used by each management business operator is a computer, such as a mega-constellation business device, an LEO constellation business device, a satellite business device, an orbital transfer business device, a debris removal business device, a rocket launch business device, and an SSA business device.

The orbit forecast information 51 includes satellite orbit forecast information 52 and debris orbit forecast information 53. In the satellite orbit forecast information 52, forecast values of orbits of satellites are set. In the debris orbit forecast information 53, forecast values of orbits of debris are set. In this embodiment, it is arranged that the satellite orbit forecast information 52 and the debris orbit forecast information 53 are included in the orbit forecast information 51. However, the satellite orbit forecast information 52 and the debris orbit forecast information 53 may be stored in the storage unit 140 as separate pieces of information.

In the orbit forecast information 51, information such as a space object identifier (ID) 511, a forecast epoch 512, forecast orbital elements 513, and a forecast error 514 is set, for example.

The space object ID 511 is an identifier that identifies a space object 60. In FIG. 10, a satellite ID and a debris ID are set as the space object ID 511. Specifically, a space object is an object such as a rocket to be launched into outer space, an artificial satellite, a space station, a debris removal satellite, a planetary space probe, or a satellite or rocket that has become debris after completing a mission.

The forecast epoch 512 is an epoch that is forecast for the orbit of each of the space objects.

The forecast orbital elements 513 are orbital elements that identify the orbit of each of the space objects. The forecast orbital elements 513 are orbital elements that are forecast for the orbit of each of the space objects. In FIG. 10, the six Keplerian elements are set as the forecast orbital elements 513.

The forecast error 514 is an error that is forecast for the orbit of each of the space objects. In the forecast error 514, a traveling direction error, an orthogonal direction error, and a basis for the error are set. In this way, the forecast error 514 explicitly indicates the amount of error included in a record value together with the basis. The basis for the amount of error includes at least one or all of means for measurement, the content of data processing performed as means for improving the precision of location coordinate information, and a result of statistical evaluation on past data.

In the orbit forecast information 51 according to this embodiment, the forecast epoch 512 and the forecast orbital elements 513 are set for the space object 60. Using the forecast epoch 512 and the forecast orbital elements 513, the time and location coordinates of the space object 60 in the near future can be obtained. For example, the time and location coordinates of the space object 60 in the near future may be set in the orbit forecast information 51.

The orbit forecast information 51 thus includes information on the orbit of each space object including the epoch and orbital elements or the time and location coordinates, and explicitly indicates forecast values of the space object 60 in the near future.

Figure 11:
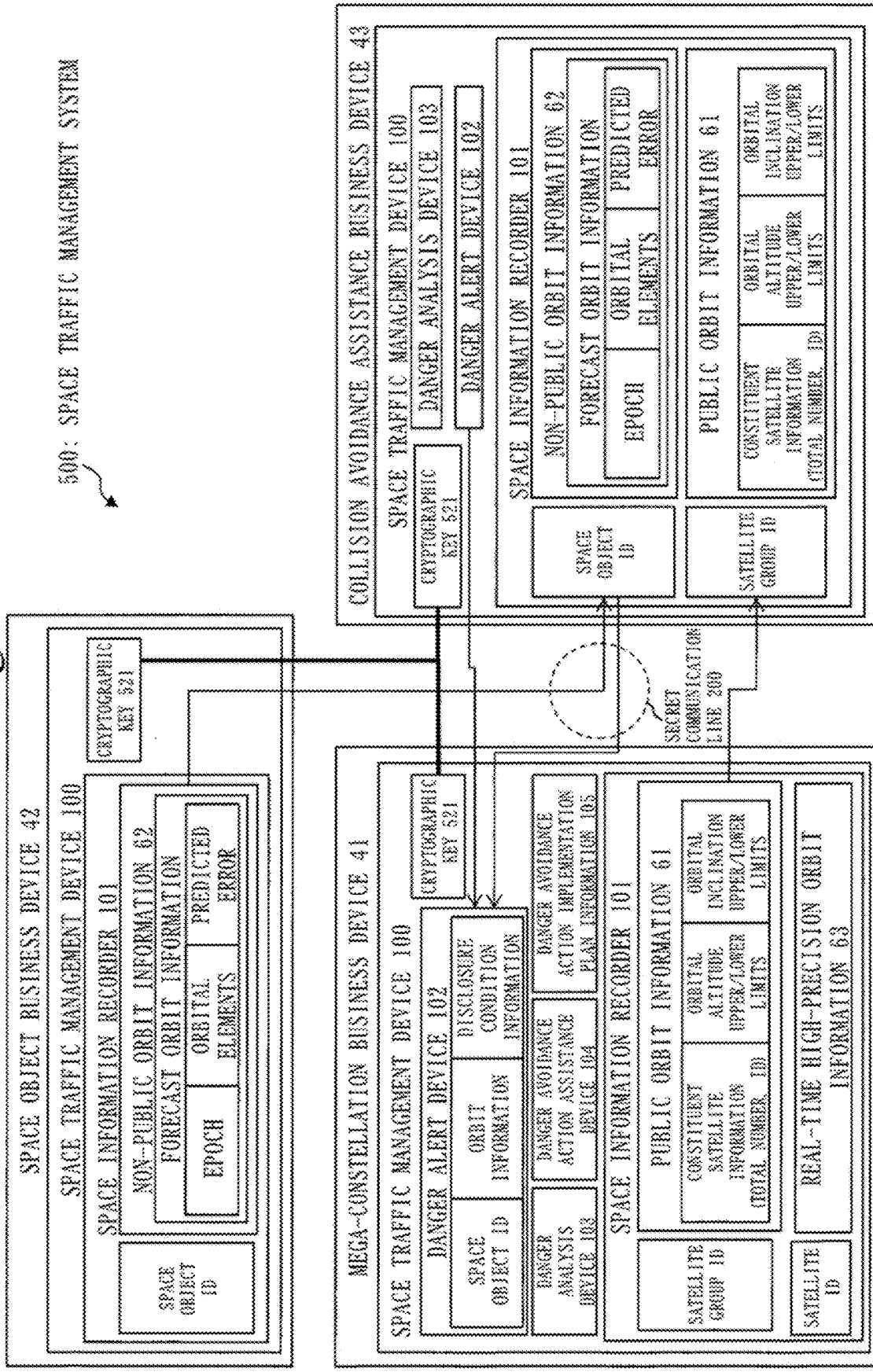
FIG. 11 is an example of a functional configuration of the space traffic management system according to Embodiment 1.

Referring to FIGS. 11 and 12, an example of a functional configuration of the space traffic management system 500 according to this embodiment will now be described. The hardware configuration of each of the space traffic management devices 100 is as described above.

The space traffic management devices 100 included in the space traffic management system 500 are mutually connected with the secret communication line 200 using the common cryptographic key 521. The space traffic management devices 100 are provided respectively in the mega-constellation business device 41, the space object business device 42, and the collision avoidance assistance business device 43.

Mega-Constellation Business Device 41

The space traffic management device 100 of the mega-constellation business device 41 includes a space information recorder 101, a danger alert device 102, a danger analysis device 103 to analyze the orbit of a space object, a danger avoidance action assistance device 104, and danger avoidance action implementation plan information 105.

The space information recorder 101 of the mega-constellation business device 41 records orbit information of satellites of a mega-constellation. A specific example of the space information recorder 101 is the orbit forecast information 51 of FIG. 10.

The space information recorder 101 includes public orbit information 61 associated with a satellite group ID that identifies a satellite group and real-time high-precision orbit information 63 associated with satellite IDs that identify satellites.

The public orbit information 61 is orbit information that can be disclosed to other business devices. In the public orbit information 61, information on constituent satellites, such as the number of satellites constituting the satellite group and satellite IDs, upper and lower limits of the orbital altitude of the satellite group, and upper and lower limits of the orbital inclination of the satellite group are set.

The real-time high-precision orbit information 63 is forecast orbit information and record orbit information of individual satellites of the satellite group.

The danger alert device 102 notifies a danger of proximity or collision with a space object. The danger alert device 102 includes orbit information associated with a space object ID that identifies a space object, and also has disclosure condition information in which a disclosure condition for the orbit information is set.

The danger analysis device 103 analyzes the orbit of a space object. For example, the danger analysis device 103 is an example of the collision analysis unit 411 that analyzes collisions between the specific space object S and individual satellites in a mega-constellation satellite group.

The danger avoidance action assistance device 104 plans responsibility assignment for an avoidance action for a space object. For example, the danger avoidance action assistance device 104 is an example of the countermeasure planning unit 412 that plans a collision avoidance countermeasure when a collision between the mega-constellation and the specific space object S is foreseen.

In the danger avoidance action implementation plan information 105, an avoidance action plan created by the danger avoidance action assistance device 104 is set.

FIG. 12 is an example of the space information recorder of the mega-constellation business device 41 according to this embodiment 1. FIG. 12 describes, in particular, details of the real-time high-precision orbit information 63.

In the real-time high-precision orbit information 63, forecast orbit information and record orbit information are set in association with each satellite ID. The forecast orbit information and the record orbit information are set such that they are real-time and highly precise.

Space Object Business Device 42

The space traffic management device 100 of the space object business device 42 includes a space information recorder 101. The space object business device 42 manages, for example, a satellite whose orbit information is not appropriate to be disclosed or whose orbit information is kept secret. Therefore, the space information recorder 101 of the space traffic management device 100 of the space object business device 42 includes non-public orbit information 62 associated with a space object ID that is the ID of the specific space object S.

In the non-public orbit information 62, forecast orbit information of the space object S is set. In the forecast orbit information, an epoch, orbital elements, and a predicted error are set, as in FIG. 10.

Collision Avoidance Assistance Business Device 43

The space traffic management device 100 of the collision avoidance assistance business device 43 includes a space information recorder 101, a danger alert device 102, and a danger analysis device 103.

The space information recorder 101 of the collision avoidance assistance business device 43 records the non-public orbit information 62 of the space object S that is received from the space object business device 42 via the secret communication line 200. The non-public orbit information 62 of the space object S is associated with the space object ID that indicates the ID of the space object S.

The space information recorder 101 of the collision avoidance assistance business device 43 also records the public orbit information 61 that is received from the mega-constellation business device 41 and is associated with a satellite group ID. In the public orbit information 61, orbit information or flight region information of a mega-constellation is set.

As described above, the database included in the space traffic management device 100 of the collision avoidance assistance business device 43 records the following information.

The non-public orbit information 62 of the specific space object S that is received from the space object business device 42 via the communication line that is kept secret. Orbit information or flight region information of a satellite group of a satellite constellation that is acquired from the mega-constellation business device 41.

The danger analysis device 103 analyzes the orbit of a space object. The danger analysis device 103 is an example of the orbit analysis unit 431 that analyzes the orbit of the specific space object S. The danger analysis device 103 analyzes, for example, whether the specific space object S will intrude into an orbital altitude region where a satellite group of a satellite constellation flies.

The danger alert device 102 notifies danger of a proximity or collision with a space object. The danger alert device 102 is an example of the notification unit 432 that notifies a mega-constellation business operator of an intrusion alert and the non-public orbit information 62 of the specific space object S via the secret communication line 200 when it is foreseen that the specific space object S will intrude into an orbital altitude region where a satellite group of a satellite constellation flies.

Description of Operation

Figure 13:
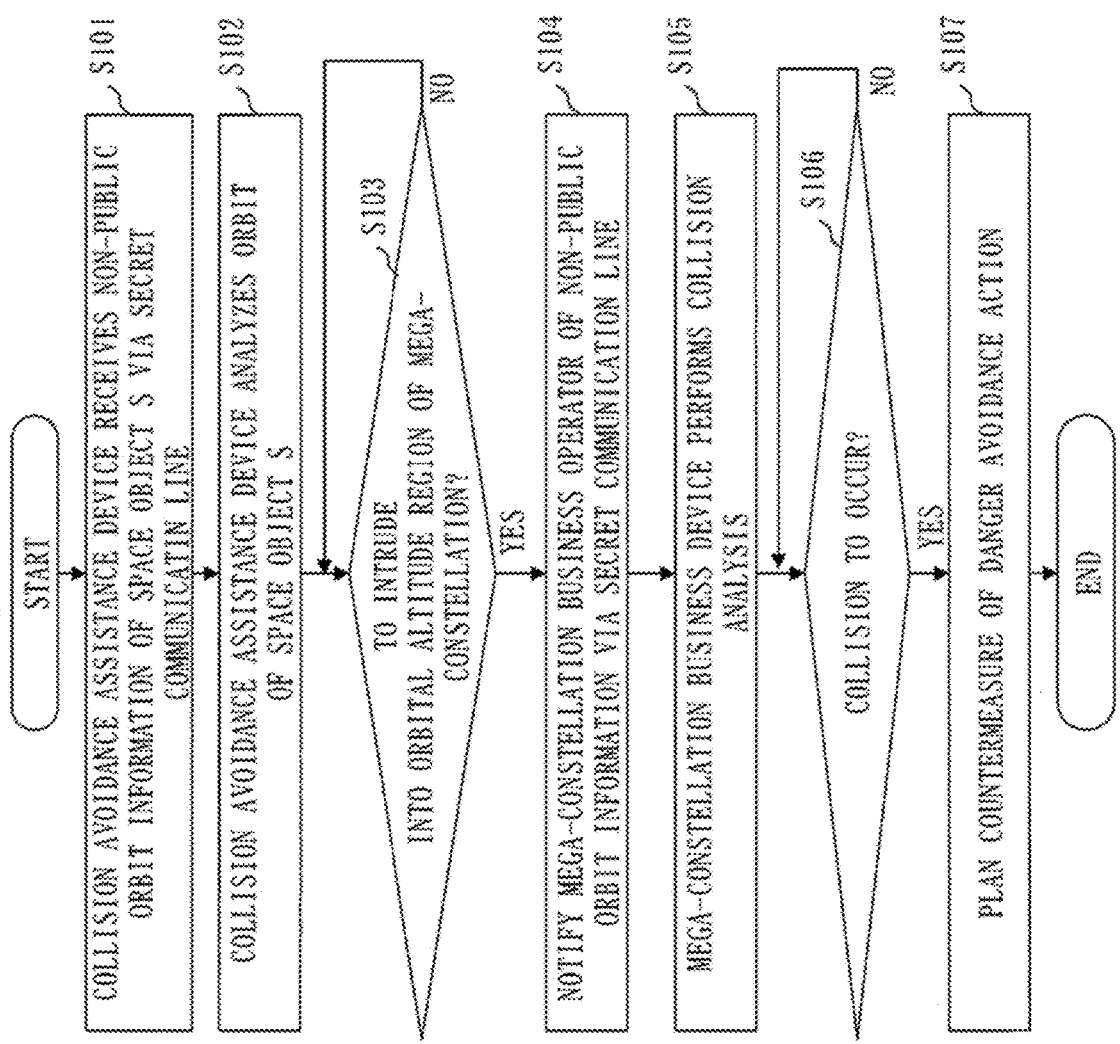
FIG. 13 is a flowchart illustrating a space traffic management process of the space traffic management system according to Embodiment 1.

FIG. 13 is a flowchart of a space traffic management process of the space traffic management system 500 according to this embodiment. The orbit analysis unit 431 and the notification unit 432 are provided in the server of the space traffic management device 100 of the collision avoidance assistance business device 43. The collision analysis unit 411 and the countermeasure planning unit 412 are provided in the server of the space traffic management device 100 of the mega-constellation business device 41.

In step S101, the space traffic management device 100 of the collision avoidance assistance business device 43 receives the non-public orbit information 62 of the specific space object S from the space object business device 42 via the secret communication line 200.

The space traffic management device 100 of the collision avoidance assistance business device 43 also receives the public orbit information 61 in which orbit information or flight region information of a mega-constellation satellite group is set from the mega-constellation business device 41. The public orbit information 61 may be communicated via the secret communication line 200, or may be communicated via an ordinary communication line. The public orbit information 61 may be recorded in advance in the database of the space traffic management device 100 of the collision avoidance assistance business device 43.

The database of the space traffic management device 100 of the collision avoidance assistance business device 43 records the non-public orbit information 62 of the specific space object S and the public orbit information 61 in which the orbit information or flight region information of the mega-constellation satellite group is set.

In step S102, the orbit analysis unit 431 analyzes the orbit of the specific space object S. Specifically, the orbit analysis unit 431 analyzes whether the specific space object S will intrude into an orbital altitude region where a satellite group of a satellite constellation flies.

In step S103, if it is foreseen that the specific space object S will intrude into the orbital altitude region where the mega-constellation satellite group flies, the process proceeds to step S104.

In step S104, the notification unit 432 notifies the mega-constellation business operator of an intrusion alert and the non-public orbit information 62 of the specific space object S via the secret communication line 200. Although the intrusion alert may be notified via an ordinary communication line, the non-public orbit information 62 is notified via the secret communication line 200.

In step S105, the collision analysis unit 411 analyzes collisions between the specific space object S and individual satellites in the mega-constellation satellite group. The collision analysis unit 411 analyzes collisions between the specific space object S and individual satellites in the mega-constellation satellite group, using the non-public orbit information 62 of the space object S and the information recorded in the space information recorder 101 of its own device.

In step S106, if a collision is foreseen, the process proceeds to step S107.

In step S107, the countermeasure planning unit 412 plans a collision avoidance countermeasure to avoid a collision between the specific space object S and a satellite in the satellite group of the satellite constellation. The collision avoidance countermeasure is set in the danger avoidance action implementation plan information 105 in the mega-constellation business device 41.

Other Configurations

In this embodiment, the functions of the space traffic management device 100 are realized by software. As a variation, the functions of the space traffic management device 100 may be realized by hardware.

Figure 14:
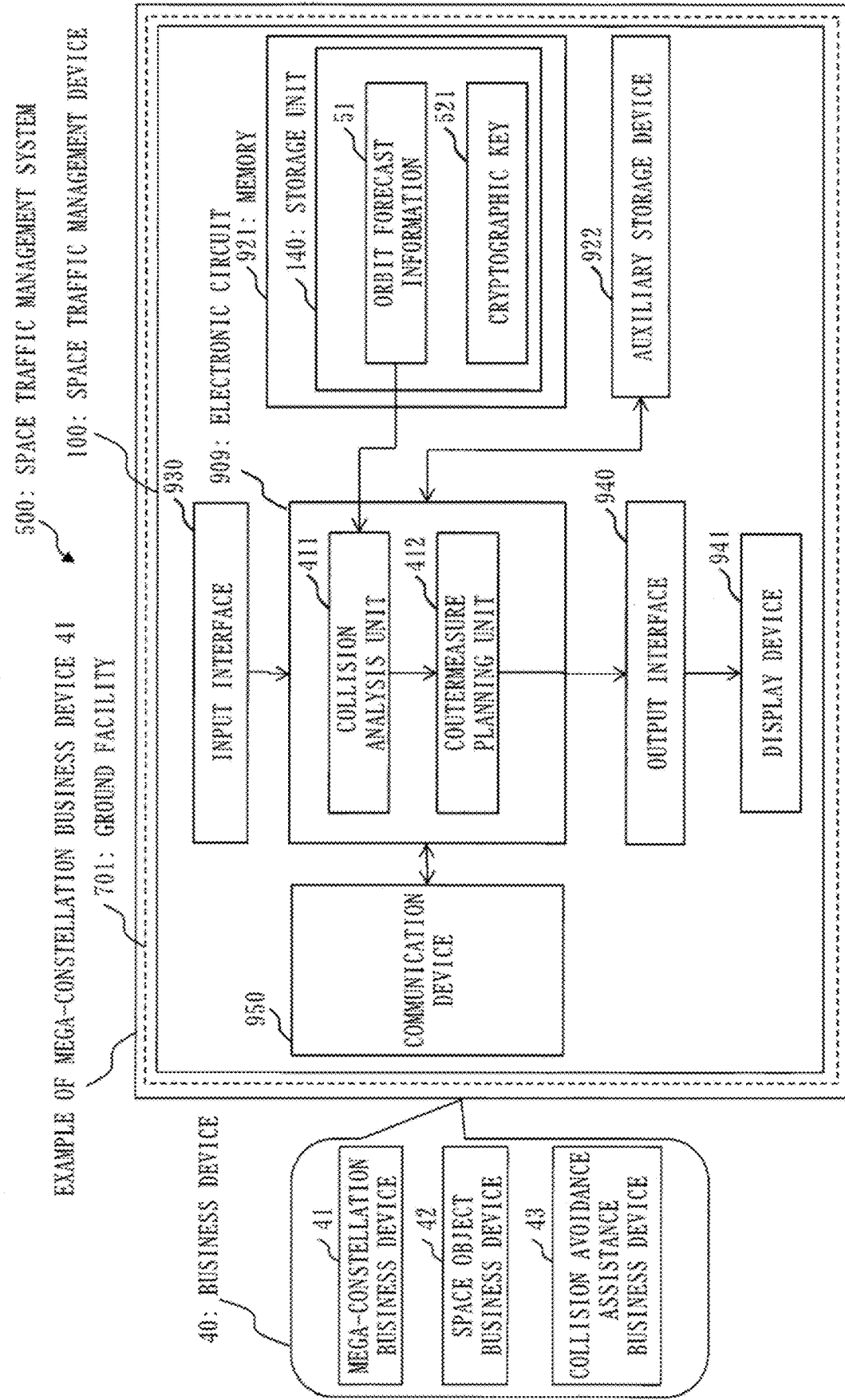
FIG. 14 is an example of a hardware configuration of the space traffic management device according to a variation of Embodiment 1.

In FIG. 14, a hardware configuration of the space traffic management device 100 according to a variation of this embodiment will be described. The hardware configuration of the space traffic management device 100 will be described using the space traffic management device 100 of the mega-constellation business device 41 as an example. It is assumed that the space traffic management devices 100 of the other business devices 40 also have substantially the same hardware configuration.

As described above, the space traffic management device 100 of the mega-constellation business device 41 includes the collision analysis unit 411, the countermeasure planning unit 412, and the storage unit 140 as an example of functional elements that realize the mega-constellation management function.

The space traffic management device 100 includes an electronic circuit 909 in place of the processor 910.

The electronic circuit 909 is a dedicated electronic circuit that realizes the functions of the space traffic management device 100.

Specifically, the electronic circuit 909 is a single circuit, a composite circuit, a programmed processor, a parallel-programmed processor, a logic IC, a GA, an ASIC, or an FPGA. GA is an abbreviation for Gate Array.

The functions of the space traffic management device 100 may be realized by one electronic circuit, or may be distributed among and realized by a plurality of electronic circuits.

As another variation, some of the functions of the space traffic management device 100 may be realized by the electronic circuit, and the rest of the functions may be realized by software.

Each of the processor and the electronic circuit is also called processing circuitry. That is, the functions of the space traffic management device 100 are realized by the processing circuitry.

Description of Effects of this Embodiment

Figure 15:
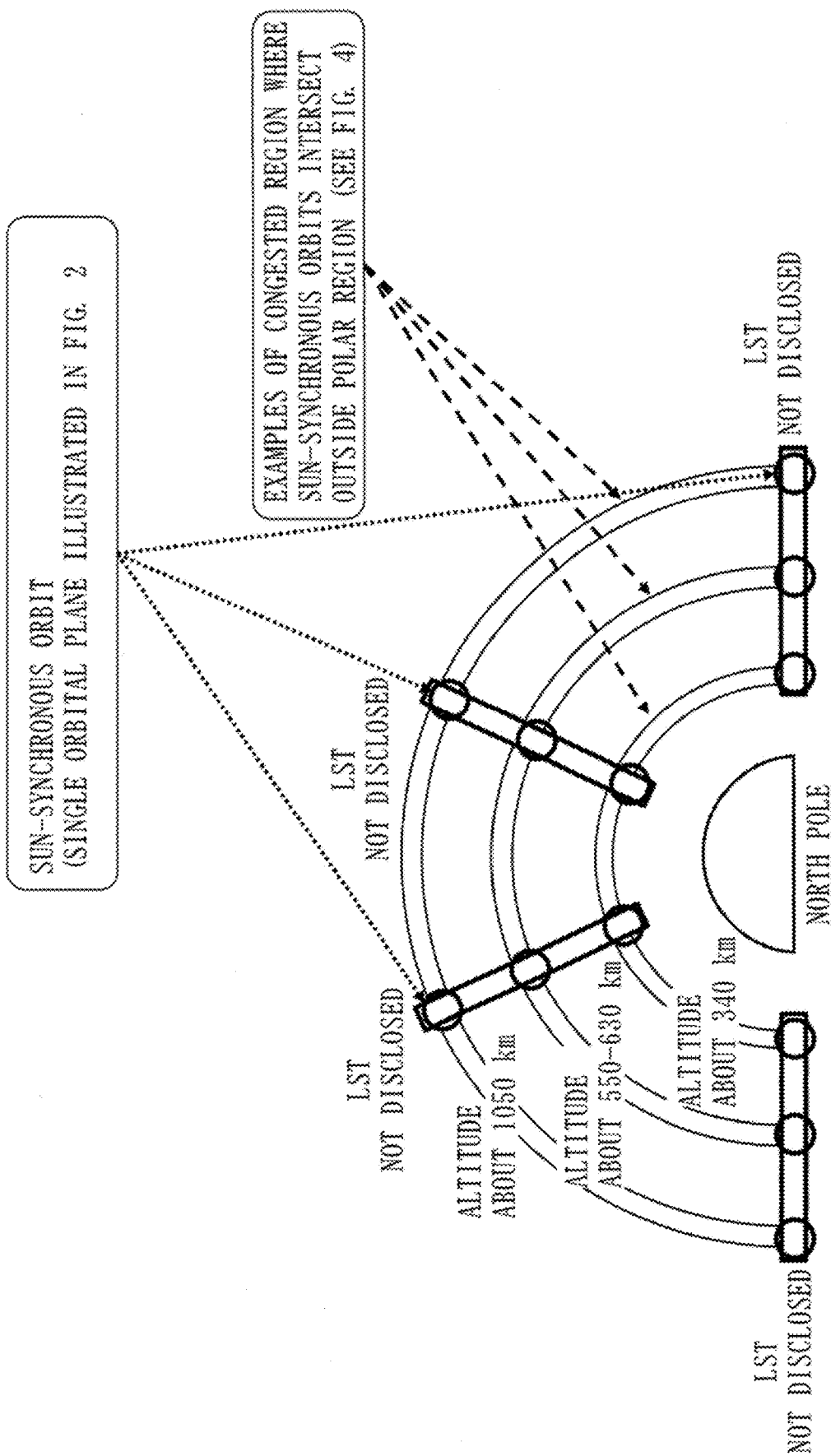
FIG. 15 is a diagram illustrating danger regions caused by a mega-constellation according to Embodiment 1.

FIG. 15 is a diagram illustrating danger regions caused by a mega-constellation according to this embodiment.

In the space traffic management system according to this embodiment, orbit information of the space object S is used as non-public information, and is provided and received via the secret communication line.

Furthermore, the collision avoidance assistance business operator holds regions where mega-constellation satellite groups fly in the database in advance. Therefore, by analyzing the orbit of the space object S, the collision avoidance assistance business device can foresee an intrusion into a flight region of a mega-constellation satellite group.

The notification of an alert for this intrusion and the non-public orbit information of the space object S to the mega-constellation business operator concerned allows collision analysis to be performed in the mega-constellation business device that holds real-time high-precision orbit information of the mega-constellation satellite group.

There is an effect that when a collision is foreseen, the collision can be avoided by a collision avoidance action by the mega-constellation satellite group.

There is an effect that even in a case in which the system for issuing alerts is transferred to a private business operator, non-public satellite information can be managed as secret information to be disclosed only to parties concerned.

Embodiment 2

In this embodiment, differences from Embodiment 1 and additions to Embodiment 1 will be mainly described.

In this embodiment, components that have substantially the same functions as those in Embodiment 1 will be denoted by the same reference signs and description thereof will be omitted.

Description of Configurations and Operation

Figure 16:
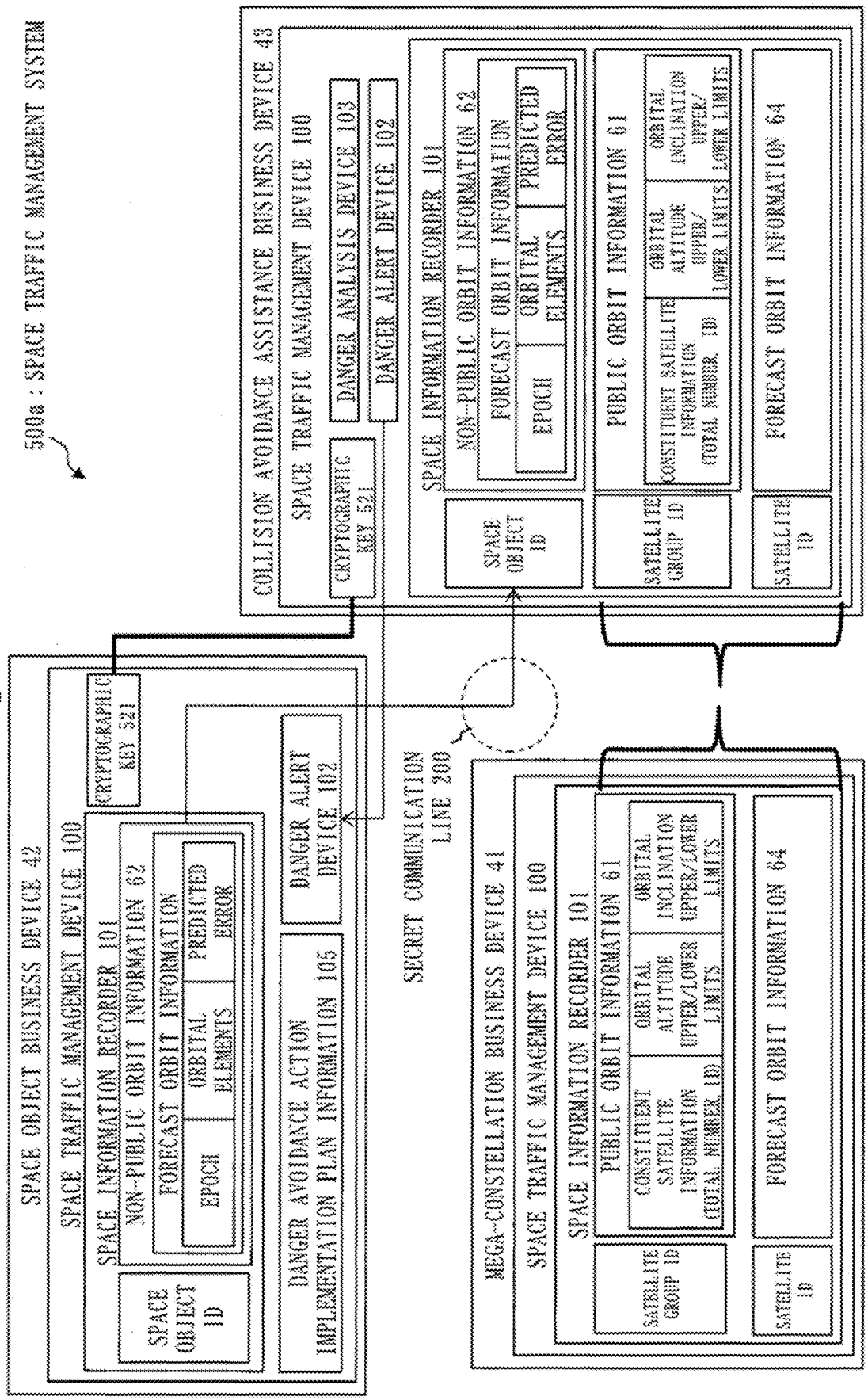
FIG. 16 is an example of a functional configuration of the space traffic management system according to Embodiment 2.

FIG. 16 is a diagram illustrating a configuration of a space traffic management system 500a according to this embodiment.

FIG. 17 is a diagram illustrating a detailed configuration of forecast orbit information 64 according to this embodiment.

Referring to FIGS. 16 and 17, an example of a functional configuration of the space traffic management system 500a according to this embodiment will be described. The hardware configuration of each of the space traffic management devices 100 is as described above.

FIG. 16 differs from FIG. 11 in that the space object business device 42 includes a danger alert device 102 and danger avoidance action implementation plan information 105.

The mega-constellation business device 41 may be without the danger alert device 102, the danger analysis device 103, the danger avoidance action assistance device 104, and the danger avoidance action implementation plan information 105.

The collision avoidance assistance business device 43 and the mega-constellation business device 41 share the forecast orbit information 64 for each satellite in addition to the public orbit information 61 for each satellite group.

The space traffic management devices 100 of the space object business device 42 and the collision avoidance assistance business device 43 are connected with the secret communication line 200 that is kept secret with the common cryptographic key 521.

The database of the space traffic management device 100 of the collision avoidance assistance business device 43 records the non-public orbit information 62 of the specific space object S that is received from the space object business device 42 via the secret communication line 200. In addition, the database of the space traffic management device 100 of the collision avoidance assistance business device 43 records the orbit information or flight region information of the mega-constellation satellite group that is acquired from the mega-constellation business device 41.

The server of the space traffic management device 100 of the collision avoidance assistance business device 43 includes the following phases.

The server of the collision avoidance assistance business device 43 analyzes the orbit of the specific space object S.

When it is foreseen that the specific space object S will intrude into the orbital altitude region where the mega-constellation satellite group flies, the server of the collision avoidance assistance business device 43 determines at least one representative satellite 311 from the mega-constellation satellite group that flies at the same orbital altitude. Then, the server acquires quasi-real-time high-precision orbit information 641, which is predicted values of the orbit of the representative satellite 311, and orbit information relative values 642 of constituent satellites 321 other than the representative satellite 311. The orbit information relative values 642 of the constituent satellites 321 are values relative to the quasi-real-time high-precision orbit information 641 of the representative satellite 311.

The server of the collision avoidance assistance business device 43 analyzes collisions between the specific space object S and individual satellites in the mega-constellation satellite group.

By the above phases, the forecast orbit information 64 for each satellite ID is recorded in the space information recorder 101 of the space traffic management device 100 of the collision avoidance assistance business device 43.

Referring to FIG. 17, the forecast orbit information 64 according to this embodiment will be described.

The forecast orbit information 64 includes the quasi-real-time high-precision orbit information 641 of the representative satellites 311 and the orbit information relative values 642 of the constituent satellites 321.

In the quasi-real-time high-precision orbit information 641 of the representative satellites 311, an epoch, orbital elements, a predicted error, an information provider business device ID, and an information update date are set for each satellite ID.

In the orbit information relative values 642 of the constituent satellites 321, a reference representative satellite ID, an orbital plane relative azimuth angle, an orbital plane relative azimuth angle, a relative elevation angle within an orbital plane, and a relative elevation angle between orbital planes are set for each satellite ID.

As illustrated in FIG. 16, the public orbit information 61 for each satellite group and the forecast orbit information 64 for each satellite are shared by the collision avoidance assistance business device 43 and the mega-constellation business device 41.

The server of the space traffic management device 100 of the space object business device 42 has a phase of creating a collision avoidance action plan when a collision is foreseen.

Specifically, when a collision between the space object S and an individual satellite in the mega-constellation satellite group is foreseen by the collision avoidance assistance business device 43, a notification is issued from the danger alert device 102 of the collision avoidance assistance business device 43 to the danger alert device 102 of the space object business device 42. Based on this notification, the server of the space object business device 42 generates danger avoidance action implementation plan information 105.

Description of Effects of this Embodiment

In the space traffic management system 500a according to this embodiment, an avoidance action may be carried out as appropriate at the discretion of a mega-constellation business operator.

With the space traffic management system 500a according to this embodiment, there is an effect that collision analysis and an collision avoidance action can be carried out by providing secret information only to a space object business operator and a collision avoidance assistance business operator.

Embodiment 3

In this embodiment, differences from Embodiments 1 and 2 and additions to Embodiments 1 and 2 will be mainly described.

In this embodiment, components that have substantially the same functions as those in Embodiments 1 and 2 will be denoted by the same reference signs and description thereof will be omitted.

Description of Configurations and Operation

Figure 18:
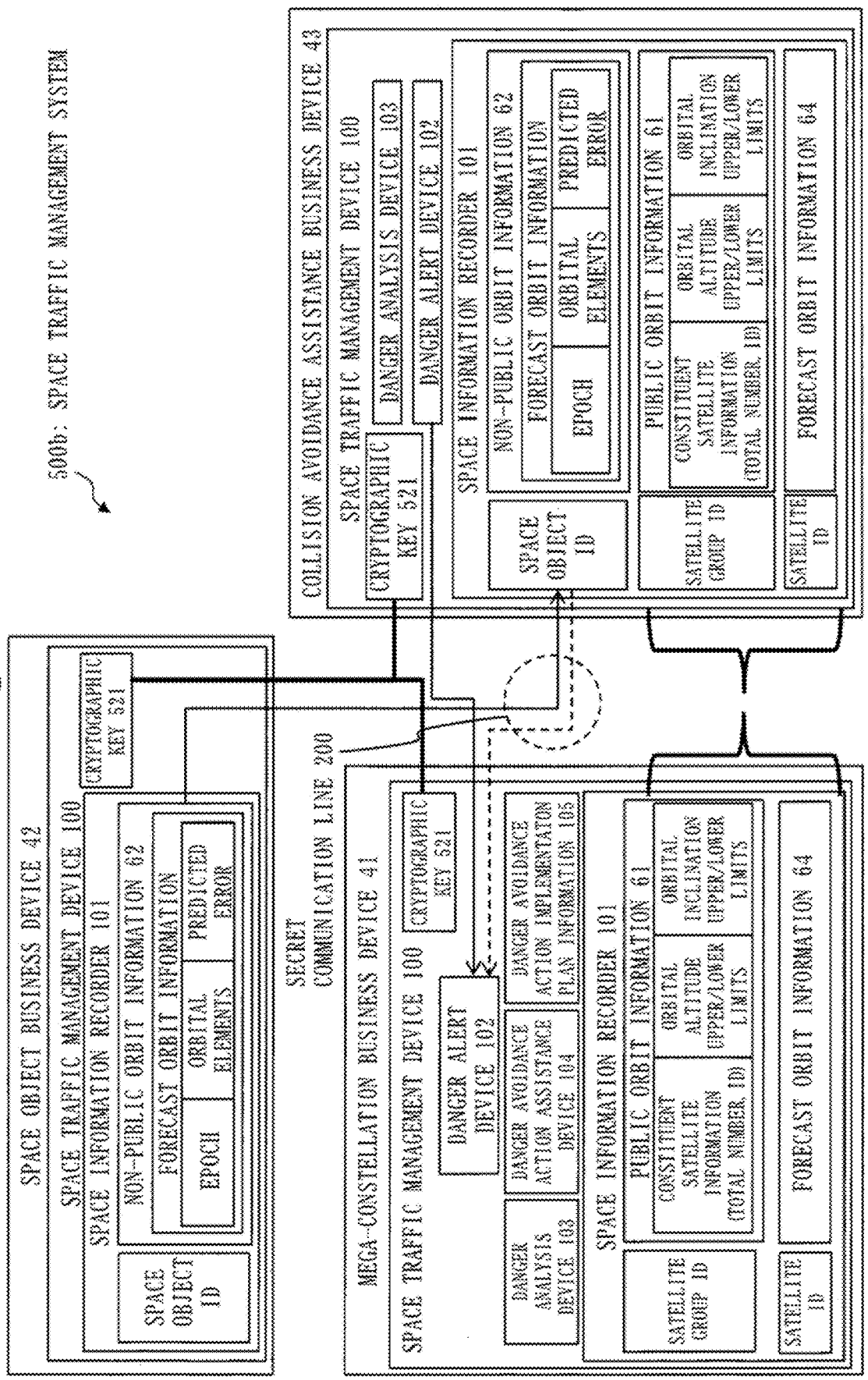
FIG. 18 is an example of a functional configuration of the space traffic management system according to Embodiment 3.

FIG. 18 is a diagram illustrating a configuration of a space traffic management system 500b according to this embodiment.

Referring to FIG. 18, an example of a functional configuration of the space traffic management system 500b according to this embodiment will be described. The hardware configuration of each of the space traffic management devices 100 is as described above.

In FIG. 18, the collision avoidance assistance business device 43 and the mega-constellation business device 41 share the forecast orbit information 64 for each satellite in addition to the public orbit information 61 for each satellite group.

The space traffic management system 500b connects the space traffic management devices 100 installed respectively in the space object business device 42, the collision avoidance assistance business device 43, and the mega-constellation business device 41 with the secret communication line 200.

The database of the space traffic management device 100 of the collision avoidance assistance business device 43 records the non-public orbit information 62 of the specific space object S that is received from the space object business device 42 via the secret communication line 200. In addition, the database of the space traffic management device 100 of the collision avoidance assistance business device 43 records orbit information or flight region information of a mega-constellation satellite group acquired from the mega-constellation business device 41.

The server of the space traffic management device 100 of the collision avoidance assistance business device 43 has the following phases.

The server of the collision avoidance assistance business device 43 analyzes the orbit of a specific space object.

When it is foreseen that the specific space object S will intrude into the orbital altitude region where the mega-constellation satellite group flies, the server of the collision avoidance assistance business device 43 determines at least one representative satellite 311 from the mega-constellation satellite group that flies at the same orbital altitude. Then, the server acquires the quasi-real-time high-precision orbit information 641, which is predicted values of the orbit of the representative satellite 311, and orbit information relative values 642 of constituent satellites 321 other than the representative satellite 311. The orbit information relative values 642 of the constituent satellites 321 are values relative to the quasi-real-time high-precision orbit information 641 of the representative satellite 311. As illustrated in FIG. 18, the public orbit information 61 for each satellite group and the forecast orbit information 64 for each satellite are shared by the collision avoidance assistance business device 43 and the mega-constellation business device 41. The configuration of the forecast orbit information 64 is substantially the same as that described in FIG. 17.

The server of the collision avoidance assistance business device 43 analyzes collisions between the specific space object S and individual satellites in the mega-constellation satellite group.

When a collision is foreseen, the server of the collision avoidance assistance business device 43 notifies the mega-constellation business operator of a collision alert and the non-public orbit information 62 of the specific space object S via the secret communication line 200.

The server included in the space traffic management device 100 of the mega-constellation business device 41 has a phase of planning a collision avoidance countermeasure. Specifically, the mega-constellation business device 41 generates danger avoidance action implementation plan information 105.

Description of Effects of this Embodiment

In the space traffic management system 500b according this embodiment, when a collision avoidance action is to be carried out on the mega-constellation side, the collision avoidance assistance business device 43 needs to share secret information with the mega-constellation business operator only when a collision alert has been issued. Therefore, with the space traffic management system 500b according to this embodiment, there is an effect that information disclosure occasions can be limited to the minimum.

In Embodiments 1 to 3 above, business devices such as the following have been described.

A satellite constellation business device is included in a space traffic management system. The satellite constellation business device includes a collision analysis unit to analyze a collision between a specific space object and an individual satellite in a satellite group of a satellite constellation and a countermeasure planning unit to plan a collision avoidance countermeasure when a collision is foreseen.

A mega-constellation business device is included in the space traffic management system. The mega-constellation business device includes a collision analysis unit to analyze a collision between a specific space object and an individual satellite in a mega-constellation satellite group and a countermeasure planning unit to plan a collision avoidance countermeasure when a collision is foreseen.

The mega-constellation business device included in the space traffic management system plans a collision avoidance countermeasure.

A space object business device included in the space traffic management system creates a collision avoidance action plan.

An SSA business device (space situational awareness business device) that conducts an SSA business also functions as the collision avoidance assistance business device.

The space object business device also functions as the collision avoidance assistance business device.

Embodiment 4

In this embodiment, differences from Embodiments 1 to 3 and additions to Embodiments 1 to 3 will be mainly described.

In this embodiment, components that have substantially the same functions as those in Embodiments 1 to 3 will be denoted by the same reference signs and description thereof will be omitted.

The emergence of mega-constellation business operators has caused a situation where several thousand satellites are flying all over the sky at orbital altitudes of 500 km and lower. As a result, there is a high risk that a satellite or the like that contributes to security will collide with a mega-constellation satellite. There may be cases in which orbit information cannot be disclosed, so that collision analysis or alert issuance by an SSA business operator or the like cannot be performed. Thus, Embodiments 1 to 3 have described arrangements for realizing a space traffic management system in which a collision avoidance assistance business operator and a mega-constellation business operator that share a cryptographic key are connected with a secret communication line, and a collision with a mega-constellation satellite group is analyzed based on non-public orbit information.

Consideration is being given to construction of a public information system called an open architecture data repository (OADR) so as to share information among business operators and secure fight safety for space objects.

In this embodiment, an arrangement in which flight safety of space objects is secured by a public information system called an OADR will be described.

When the OADR is constructed as a public institution for international cooperation, an authority for issuing an instruction or a request across a national border may be given to a business operator.

For example, to centrally manage orbit information of space objects held by business operators around the world, it is rational if an instruction or request to provide orbit information to the OADR can be made under rules based on an international consensus.

When a particular country constructs the OADR as a public institution, an authority to issue an instruction or request may be given to a business operator in the country concerned.

It may be arranged such that information is disclosed unconditionally to business operators of the country concerned and information is disclosed conditionally to other business operators.

As disclosure conditions, a payment requirement, a fee setting, a restriction of disclosed items, a restriction of precision of disclosed information, a restriction of disclosure frequency, non-disclosure to a specific business operator, and so on may be set.

For example, a difference between free and chargeable or a difference in fee for acquiring information may arise between the country concerned and other countries, and the setting of disclosure conditions by the OADR will have influence in creating a system of space traffic management or in terms of industrial competitiveness.

It is rational that confidential information on space objects that contributes to security is held by the OADR constructed as a public institution by a nation and is not disclosed to third parties. For this reason, the OADR may include a database to store non-public information in addition to a database for the purpose of information disclosure.

Space object information held by a private business operator includes information that cannot be disclosed generally due to corporate secrets or the like. There is also information that is not appropriate to be disclosed generally because of a huge amount of information or a high update frequency due to constant maneuver control.

When danger analysis and analytical evaluation related to proximities or collisions between space objects are to be performed, it is necessary to take into account orbit information of all space objects regardless of whether or not space objects require confidentiality. For this reason, it is rational that the OADR as a public institution carries out danger analysis taking confidential information into account, and discloses information conditionally by restricting a disclosure recipient or disclosure content if danger is foreseen as a result of analytical evaluation. For example, it is rational to process information to allow disclosure and then disclose the information by restricting a disclosure recipient or disclosure content, such as disclosing only orbit information of a time period with danger to a disclosure recipient that will contribute to avoiding the danger.

If the number of objects in orbit increases and the risk of proximity or collision increases in the future, various danger avoidance measures will be necessary, such as means by which a debris removal business operator removes dangerous debris or means by which a mega-constellation business operator changes an orbital location or passage timing to avoid a collision. If the OADR that is a public institution can instruct or request a business operator to execute a danger avoidance action, a significant effect can be expected in securing flight safety in space.

There are space objects that are managed by an institution such as a venture business operator in an emerging country or a university that has little experience in space business and lacks information that contributes to danger avoidance. If it is foreseen that a space object managed by such an institution that has little experience in space business and lacks information that contributes to danger avoidance will intrude into an orbital altitude zone in which a mega-constellation flies, danger avoidance can be effected promptly and effectively by the OADR acting as an intermediary to transmit information to business operators as required.

In addition, by executing a danger avoidance measure or by interceding for or introducing space insurance for private business operators, contribution can be made to the promotion and industrialization of space traffic management.

Arrangements for realizing the OADR include the following arrangements.

An arrangement that includes only a public database.

An arrangement that has danger analysis means, collision avoidance assistance means, or space situational awareness (SSA) means, and independently contributes to danger avoidance.

An arrangement that makes an instruction or request to a business operator or performs intercession or introduction for a business operator, and contributes to danger avoidance by information management.

As arrangements for realizing the OADR, there are also various possibilities other than the above arrangements.

Note that "the OADR intercedes for implementation of a space traffic management method" means, for example, a case in which the entities that implement the space traffic management method are external business devices other than the OADR, and the OADR mediates between the business devices to prompt the implementation instead of forcibly ordering it. That "the OADR intercedes for implementation of the space traffic management method" is rephrased, for example, as "the OADR mediates so that external business devices other than the OADR cooperatively implement the space traffic management method". Alternatively, "mediates" may be replaced with "provides direction".

Configuration examples of the OADR according to this embodiment will be described below.

Configuration Example 1 of the OADR

Figure 19:
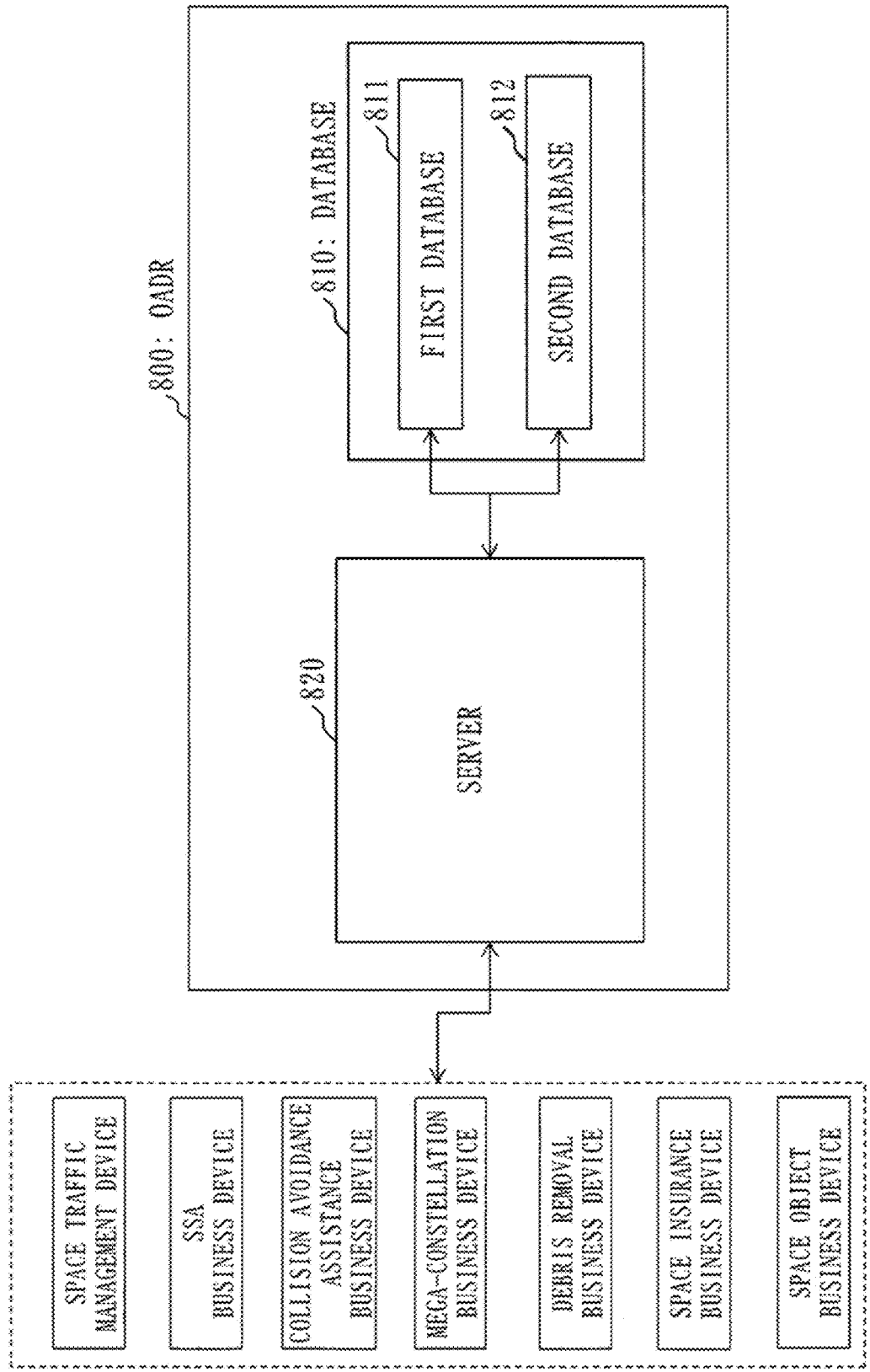
FIG. 19 is an example of a functional configuration of an OADR according to Embodiment 4.

FIG. 19 is Configuration Example 1 of an OADR 800 according to this embodiment.

The OADR 800 is a public information system that discloses orbit information of a space object. The OADR 800 includes a database 810 to store orbit information of space objects and a server 820.

The database 810 includes a first database 811 to store pubic information and a second database 812 to store non-public information.

The server 820 acquires space object information including non-public information from all or at least one of a space traffic management device, an SSA business device (space situational awareness business device), a collision avoidance assistance business device, a mega-constellation business device, and a debris removal business device, and stores the space object information in the second database 812. The space traffic management device is provided in the CSpOC, for example.

The CSpOC of the United States has not so far been equipped with a bidirectional line and has unidirectionally notified danger alerts. If the CSpOC is equipped with a space traffic management device, the space traffic management device allows contribution to be made to space traffic management through a bidirectional communication line with other business devices.

The server 820 generates conditional public information for which a disclosure recipient and disclosure content are restricted and stores the conditional public information in the first database 811.

The server 820 transmits the conditional public information to only a specific business device among the SSA business device, the collision avoidance assistance business device, the mega-constellation business device, the debris removal business device, and a space insurance business device that handles space insurance.

The OADR 800 of Configuration Example 1 realizes the above-described functions and also intercedes for implementation of the space traffic management method described in Embodiments 1 to 3.

Confidential information on space objects that is held by the CSpOC and contributes to security may be disclosed only to the OADR. A proximity or collision risk needs to be analyzed and foreseen by taking confidential information into account.

Confidential information is processed into information that can be disclosed conditionally and then conditional public information that contributes to collision avoidance assistance is shared with only a business device involved in a collision risk. This allows even a private business operator to carry out a collision avoidance action.

In addition, with regard to space object information held by private business operators, if the OADR similarly processes space object information that cannot be generally disclosed into information that can be disclosed conditionally, collision avoidance becomes possible.

Configuration Example 2 of the OADR

Figure 20:
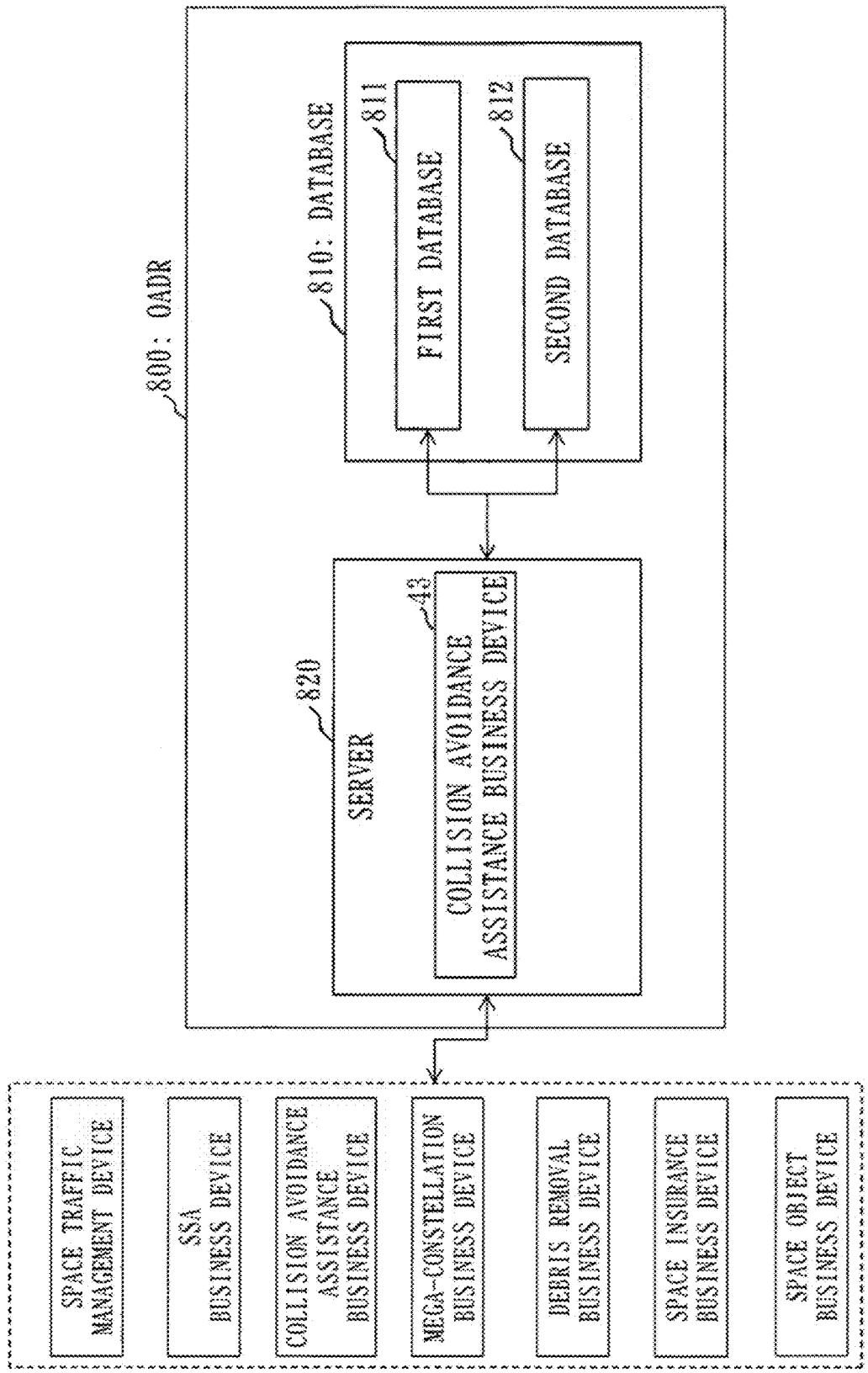
FIG. 20 is an example of the functional configuration of the OADR according to Embodiment 4.

FIG. 20 is Configuration Example 2 of the OADR 800 according to this embodiment.

Configuration Example 2 of the OADR 800 includes the collision avoidance assistance business device described in Embodiments 1 to 3 in addition to Configuration Example 1. As illustrated in FIG. 20, the server 820 may be configured to include the functions of the collision avoidance assistance business device.

The server 820 acquires space object information including non-public information from all or at least one of a space traffic management device, an SSA business device, a different collision avoidance assistance business device, a mega-constellation business device, a debris removal business device, and a space object business device, and stores the space object information in the second database 812. The space traffic management device is installed in the CSpOC, for example.

Note that the different collision avoidance assistance business device is a collision avoidance assistance business device other than the collision avoidance assistance business device included in the OADR 800.

The server 820 generates conditional public information for which a disclosure recipient and disclosure content are restricted and stores the conditional public information in the first database 811.

The server 820 transmits the conditional public information only to a specific business device among the SSA business device, the different collision avoidance assistance business device, the mega-constellation business device, the debris removal business device, the space object business device, and a space insurance business device that handles space insurance.

By arranging that the OADR functions as a collision avoidance assistance business operator as in Configuration Example 2, similar effects as those of Configuration Example 1 can be obtained.

In Embodiments 1 to 4 above, each unit of the space traffic management system and the space traffic management device has been described as an independent functional block. However, the configurations of the space traffic management system and the space traffic management device may be different from the configurations described in the above embodiments. The functional blocks of the space traffic management system and the space traffic management device may be arranged in any configuration, provided that the functions described in the above embodiments can be realized. Each of the space traffic management system and the space traffic management device may be a single device or a system composed of a plurality of devices.

Portions of Embodiments 1 to 4 may be implemented in combination. Alternatively, one portion of these embodiments may be implemented. These embodiments may be implemented as a whole or partially in any combination.

That is, in Embodiments 1 to 4, portions of Embodiments 1 to 4 may be freely combined, or any constituent element may be modified. Alternatively, in Embodiments 1 to 4, any constituent element may be omitted.

The embodiments described above are essentially preferable examples and are not intended to limit the scope of the present disclosure, the scope of applications of the present disclosure, and the scope of uses of the present disclosure. The embodiments described above can be modified in various ways as necessary.

REFERENCE SIGNS LIST

20: satellite constellation; 21: orbital plane; 30: satellite; 311: representative satellite; 321: constituent satellite; 31: satellite control device; 32: satellite communication device; 33: propulsion device; 34: attitude control device; 35: power supply device; 40: business device; 41: mega-constellation business device; 411: collision analysis unit; 412: countermeasure planning unit; 431: orbit analysis unit; 432: notification unit; 42: space object business device; 43: collision avoidance assistance business device; 51: orbit forecast information; 52: satellite orbit forecast information; 53: debris orbit forecast information; 511: space object ID; 512: forecast epoch; 513: forecast orbital elements; 514: forecast error; 521: cryptographic key; 60: space object; 70: Earth; 100: space traffic management device; 140: storage unit; 55: orbit control command; 61: public orbit information; 62:

non-public orbit information; 63: real-time high-precision orbit information; 64: forecast orbit information; 641: quasi-real-time high-precision orbit information; 642: orbit information relative value; 500, 500a, 500b: space traffic management system; 600: satellite constellation forming system; 11, 11b: satellite constellation forming unit; 300: satellite group; 700, 701: ground facility; 510: orbit control command generation unit; 520: analytical prediction unit; 909: electronic circuit; 910: processor; 921: memory; 922: auxiliary storage device; 930: input interface; 940: output interface; 941: display device; 950: communication device; 101: space information recorder; 102: danger alert device; 103: danger analysis device; 104: danger avoidance action assistance device; 105: danger avoidance action implementation plan information; 200: secret communication line; 800: OADR; 810: database; 811: first database; 812: second database; 820: server.

The invention claimed is:

1. A space traffic management system in which space traffic management devices, installed respectively in each of a space object business device that manages a specific space object, a collision avoidance assistance business device that assists avoidance between space objects, and a satellite constellation business device that manages a satellite constellation composed of a plurality of satellites, are connected with a communication line that is kept secret with a common cryptographic key, each of the space traffic management devices including a database and a server,
wherein the database included in each of the space traffic management devices of the collision avoidance assistance business device records non-public orbit information of the specific space object that is received from the space object business device via the communication line that is kept secret and orbit information or flight region information of a satellite group of a satellite constellation that is acquired from the satellite constellation business device,
wherein the server included in each of the space traffic management devices of the collision avoidance assistance business device includes:
processing circuitry to
analyze an orbit of the specific space object, and
under a condition where the processing circuitry foresees that the specific space object will intrude into an orbital altitude region where the satellite group of the satellite constellation flies, notify a satellite constellation business operator of an intrusion alert and the non-public orbit information of the specific space object via the communication line that is kept secret, and
wherein the server included in each of the space traffic management devices of the satellite constellation business device includes:
processing circuitry to
analyze a potential collision between the specific space object and an individual satellite in the satellite group of the satellite constellation, and
plan a collision avoidance countermeasure under a condition where potential collision is foreseen to result in an actual collision.

2. The space traffic management system according to claim 1,
wherein the satellite constellation business device is a mega-constellation business device that manages a satellite constellation composed of 100 or more satellites.

3. The mega-constellation business device included in the space traffic management system according to claim 2,
wherein the mega-constellation business device plans the collision avoidance countermeasure.

4. A space traffic management device installed in a space traffic management system in which space traffic management devices, installed respectively in each of a space object business device that manages a specific space object, a collision avoidance assistance business device that assists avoidance of a collision between space objects, and a satellite constellation business device that manages a satellite constellation composed of a plurality of satellites, are connected with a communication line that is kept secret with a common cryptographic key, each of the space traffic management devices including a database and a server,
wherein the database records non-public orbit information of the specific space object that is received from the space object business device via the communication line that is kept secret and orbit information or flight region information of a satellite group of a satellite constellation that is acquired from the satellite constellation business device, and
wherein the server includes:
processing circuitry to
analyze an orbit of the specific space object, and
under a condition where it is foreseen that the specific space object will intrude into an orbital altitude region where the satellite group of the satellite constellation flies, notify a satellite constellation business operator of an intrusion alert and the non-public orbit information of the specific space object via the communication line that is kept secret.

5. A space traffic management method of a space traffic management system in which space traffic management devices, installed respectively in each of a space object business device that manages a specific space object, a collision avoidance assistance business device that assists avoidance between space objects, and a satellite constellation business device that manages a satellite constellation composed of a plurality of satellites, are connected with a communication line that is kept secret with a common cryptographic key, each of the space traffic management devices including a database and a server,
wherein the database included in each of the space traffic management devices of the collision avoidance assistance business device records non-public orbit information of the specific space object that is received from the space object business device via the communication line that is kept secret and orbit information or flight region information of a satellite group of a satellite constellation that is acquired from the satellite constellation business device,
wherein the server included in each of the space traffic management devices of the collision avoidance assistance business device analyzes an orbit of the specific space object, and under a condition where it is foreseen that the specific space object will intrude into an orbital altitude region where the satellite group of the satellite constellation flies, notifies a satellite constellation business operator of an intrusion alert and the non-public orbit information of the specific space object via the communication line that is kept secret, and
wherein the server included in each of the space traffic management devices of the satellite constellation business device analyzes a potential collision between the specific space object and an individual satellite in the satellite group of the satellite constellation, and plans a collision avoidance countermeasure under a condition where the potential collision is foreseen to result in an actual collision.

6. A collision avoidance assistance business device of a space traffic management system in which space traffic management devices, installed respectively in each of a space object business device that manages a specific space object, the collision avoidance assistance business device that assists avoidance of a collision between space objects, and a satellite constellation business device that manages a satellite constellation composed of a plurality of satellites, are connected with a communication line that is kept secret with a common cryptographic key, each of the space traffic management devices including a database and a server,
wherein the database included in each of the space traffic management devices of the collision avoidance assistance business device records non-public orbit information of the specific space object that is received from the space object business device via the communication line that is kept secret and orbit information or flight region information of a satellite group of a satellite constellation that is acquired from the satellite constellation business device, and
wherein the server included in each of the space traffic management devices of the collision avoidance assistance business device includes:
processing circuitry to
analyze an orbit of the specific space object, and
under a condition where it is foreseen that the specific space object will intrude into an orbital altitude region where the satellite group of the satellite constellation flies, notify a satellite constellation business operator of an intrusion alert and the non-public orbit information of the specific space object via the communication line that is kept secret.

7. A space situational awareness business device that conducts a space situational awareness (SSA) business and also functions as the collision avoidance assistance business device according to claim 6.

8. A space object business device that also functions as the collision avoidance assistance business device according to claim 6.

9. A space traffic management system in which space traffic management devices, installed respectively in each of a space object business device that manages a specific space object, a collision avoidance assistance business device that assists avoidance between space objects, and a mega-constellation business device that manages a mega-constellation, which is a satellite constellation composed of 100 or more satellites, are connected with a first communication line, each of the space traffic management devices including a database and a server,
wherein the space traffic management devices of the space object business device and the collision avoidance assistance business device are connected with a second communication line that is kept secret with a common cryptographic key,
wherein the database of each of the space traffic management devices of the collision avoidance assistance business device records non-public orbit information of the specific space object that is received from the space object business device via the second communication line that is kept secret and orbit information or flight region information of a mega-constellation satellite group that is acquired from the mega-constellation business device, wherein the server of each of the space traffic management devices of the collision avoidance assistance business device is configured to implement a plurality of phases including:
a phase of analyzing an orbit of the specific space object,
a phase of, under a condition where it is foreseen that the specific space object will intrude into an orbital altitude region where the mega-constellation satellite group flies, determining at least one representative satellite from the mega-constellation satellite group that flies at a same orbital altitude, and acquiring quasi-real-time high-precision orbit information, which is a predicted value of an orbit of the representative satellite, and an orbit information relative value of a constituent satellite other than the representative satellite, the orbit information relative value being a value relative to the quasi-real-time high-precision orbit information of the representative satellite, and
a phase of analyzing a potential collision between the specific space object and an individual satellite in the mega-constellation satellite group, and
wherein the server of each of the space traffic management devices of the space object business device includes:
a phase of creating a collision avoidance action plan under a condition where the potential collision is foreseen to result in an actual collision.

10. The space object business device included in the space traffic management system according to claim 9,
wherein the space object business device creates the collision avoidance action plan.

11. A collision avoidance assistance business device of a space traffic management system in which space traffic management devices, installed respectively in each of a space object business device that manages a specific space object, the collision avoidance assistance business device that assists avoidance between space objects, and a mega-constellation business device that manages a mega-constellation, which is a satellite constellation composed of 100 or more satellites, are connected with a first communication line, each of the space traffic management devices including a database and a server,
wherein the space traffic management devices of the space object business device and the collision avoidance assistance business device are connected with a second communication line that is kept secret with a common cryptographic key,
wherein the database of each of the space traffic management devices of the collision avoidance assistance business device records non-public orbit information of the specific space object that is received from the space object business device via the second communication line that is kept secret and orbit information or flight region information of a mega-constellation satellite group that is acquired from the mega-constellation business device, and
wherein the server of each of the space traffic management devices of the collision avoidance assistance business device is configured to implement a plurality of phases including:
a phase of analyzing an orbit of the specific space object,
a phase of, under a condition where it is foreseen that the specific space object will intrude into an orbital altitude region where the mega-constellation satellite group flies, determining at least one representative satellite from the mega-constellation satellite group that flies at a same orbital altitude, and acquiring quasi-real-time high-precision orbit information, which is a predicted value of an orbit of the representative satellite, and an orbit information relative value of a constituent satellite other than the representative satellite, the orbit information relative value being a value relative to the quasi-real-time high-precision orbit information of the representative satellite, and a phase of analyzing a potential collision between the specific space object and an individual satellite in the mega-constellation satellite group.

12. A space traffic management method of a space traffic management system in which space traffic management devices, installed respectively in each of a space object business device that manages a specific space object, a collision avoidance assistance business device that assists avoidance between space objects, and a mega-constellation business device that manages a mega-constellation, which is a satellite constellation composed of 100 or more satellites, are connected with a first communication line, each of the space traffic management devices including a database and a server, wherein the space traffic management devices of the space object business device and the collision avoidance assistance business device are connected with a second communication line that is kept secret with a common cryptographic key, wherein the database of each of the space traffic management devices of the collision avoidance assistance business device records non-public orbit information of the specific space object that is received from the space object business device via the second communication line that is kept secret and orbit information or flight region information of a mega-constellation satellite group that is acquired from the mega-constellation business device, wherein the server of each of the space traffic management devices of the collision avoidance assistance business device analyzes an orbit of the specific space object, determines at least one representative satellite from the mega-constellation satellite group that flies at a same orbital altitude under a condition where it is foreseen that the specific space object will intrude into an orbital altitude region where the mega-constellation satellite group flies, and acquires quasi-real-time high-precision orbit information, which is a predicted value of an orbit of the representative satellite, and an orbit information relative value of a constituent satellite other than the representative satellite, the orbit information relative value being a value relative to the quasi-real-time high-precision orbit information of the representative satellite, and analyzes a potential collision between the specific space object and an individual satellite in the mega-constellation satellite group, and wherein the server of each of the space traffic management devices of the space object business device creates a collision avoidance action plan under a condition where the potential collision is foreseen to result in an actual collision.

13. A space traffic management system in which space traffic management devices, installed respectively in each of a space object business device that manages a specific space object, a collision avoidance assistance business device that assists avoidance between space objects, and a mega-constellation business device that manages a mega-constellation, which is a satellite constellation composed of 100 or more satellites, are connected with a communication line that is kept secret with a common cryptographic key, each of the space traffic management devices including a database and a server, wherein the database included in each of the space traffic management devices of the collision avoidance assistance business device records non-public orbit information of the specific space object that is received from the space object business device via the communication line that is kept secret and orbit information or flight region information of a mega-constellation satellite group that is acquired from the mega-constellation business device, wherein the server included in each of the space traffic management devices of the collision avoidance assistance business device is configured to implement a plurality of phases including:

a phase of analyzing an orbit of the specific space object, a phase of, under a condition where it is foreseen that the specific space object will intrude into an orbital altitude region where the mega-constellation satellite group flies, determining at least one representative satellite from the mega-constellation satellite group that flies at a same orbital altitude, and acquiring quasi-real-time high-precision orbit information, which is a predicted value of an orbit of the representative satellite, and an orbit information relative value of a constituent satellite other than the representative satellite, the orbit information relative value being a value relative to the quasi-real-time high-precision orbit information of the representative satellite, a phase of analyzing a potential collision between the specific space object and an individual satellite in the mega-constellation satellite group, and a phase of, under a condition where the potential collision is foreseen to result in an actual collision, notifying a mega-constellation business operator of a collision alert and the non-public orbit information of the specific space object via the communication line that is kept secret, and wherein the server included in the space traffic management device of the mega-constellation business device includes:

a phase of planning a collision avoidance countermeasure.

14. A collision avoidance assistance business device of a space traffic management system in which space traffic management devices, installed respectively in each of a space object business device that manages a specific space object, the collision avoidance assistance business device that assists avoidance between space objects, and a mega-constellation business device that manages a mega-constellation, which is a satellite constellation composed of 100 or more satellites, are connected with a communication line that is kept secret with a common cryptographic key, each of the space traffic management devices including a database and a server, wherein the database included in each of the space traffic management devices of the collision avoidance assistance business device records non-public orbit information of the specific space object that is received from the space object business device via the communication line that is kept secret and orbit information or flight region information of a mega-constellation satellite group that is acquired from the mega-constellation business device, and wherein the server included in each of the space traffic management devices of the collision avoidance assistance business device is configured to implement a plurality of phases including:
- a phase of analyzing an orbit of the specific space object,
- a phase of, under a condition where it is foreseen that the specific space object will intrude into an orbital altitude region where the mega-constellation satellite group flies, determining at least one representative satellite from the mega-constellation satellite group that flies at a same orbital altitude, and acquiring quasi-real-time high-precision orbit information, which is a predicted value of an orbit of the representative satellite, and an orbit information relative value of a constituent satellite other than the representative satellite, the orbit information relative value being a value relative to the quasi-real-time high-precision orbit information of the representative satellite,
- a phase of analyzing a potential collision between the specific space object and an individual satellite in the mega-constellation satellite group, and
- a phase of, under a condition where the potential collision is foreseen to result in an actual collision, notifying a mega-constellation business operator of a collision alert and the non-public orbit information of the specific space object via the communication line that is kept secret.

15. A space traffic management method of a space traffic management system in which space traffic management devices, installed respectively in each of a space object business device that manages a specific space object, a collision avoidance assistance business device that assists avoidance between space objects, and a mega-constellation business device that manages a mega-constellation, which is a satellite constellation composed of 100 or more satellites, are connected with a communication line that is kept secret with a common cryptographic key, each of the space traffic management devices including a database and a server, wherein the database included in each of the space traffic management devices of the collision avoidance assistance business device records non-public orbit information of the specific space object that is received from the space object business device via the communication line that is kept secret and orbit information or flight region information of a mega-constellation satellite group that is acquired from the mega-constellation business device, wherein the server included in each of the space traffic management devices of the collision avoidance assistance business device analyzes an orbit of the specific space object, determines at least one representative satellite from the mega-constellation satellite group that flies at a same orbital altitude under a condition where it is foreseen that the specific space object will intrude into an orbital altitude region where the mega-constellation satellite group flies, and acquires quasi-real-time high-precision orbit information, which is a predicted value of an orbit of the representative satellite, and an orbit information relative value of a constituent satellite other than the representative satellite, the orbit information relative value being a value relative to the quasi-real-time high-precision orbit information of the representative satellite, analyzes a potential collision between the specific space object and an individual satellite in the mega-constellation satellite group, and under a condition where the potential collision is foreseen to result in an actual collision, notifies a mega-constellation business operator of a collision alert and the non-public orbit information of the specific space object via the communication line that is kept secret, and wherein the server included in each of the space traffic management devices of the mega-constellation business device plans a collision avoidance countermeasure.

16. An open architecture data repository (OADR) that intercedes for implementation of the space traffic management method according to claim 5, the OADR comprising a database to store orbit information of a space object and a server, and being a public information system that discloses orbit information of a space object, wherein the database includes a first database to store public information and a second database to store non-public information, and wherein the server acquires space object information including non-pubic information from all or at least one of a space traffic management device that manages space traffic, a space situational awareness business device that monitors a space situation, a collision avoidance assistance business device that assists avoidance between space objects in space, a mega-constellation business device that manages a mega-constellation, and a debris removal business device that assists removal of debris, and stores the space object information in the second database, the mega-constellation being a satellite constellation composed of 100 or more satellites, generates conditional public information for which a disclosure recipient and disclosure content are limited and stores the conditional public information in the first database, and transmits the conditional public information to only a specific business device among the space situational awareness business device, the collision avoidance assistance business device, the mega-constellation business device, the debris removal business device, and a space insurance business device that handles space insurance.

17. An open architecture data repository (OADR) that is a public information system that discloses orbit information of a space object, the OADR comprising a database to store orbit information of a space object, a server, and the collision avoidance assistance business device according to claim 6, wherein the database includes a first database to store public information and a second database to store non-public information, wherein the server acquires space object information including non-pubic information from all or at least one of a space traffic management device that manages space traffic, a space situational awareness business device that monitors a space situation, a different collision avoidance assistance business device not included in the OADR itself, a mega-constellation business device that manages a mega-constellation, and a space object business device that manages a specific space object, and stores the space object information in the second database, generates conditional public information for which a disclosure recipient and disclosure content are limited and stores the conditional public information in the first database, and transmits the conditional public information to only a specific business device among the space situational awareness business device, the different collision avoidance assistance business device, the mega-constellation business device, the debris removal business device, the space object business device, and a space insurance business device that handles space insurance, and wherein the mega-constellation is a satellite constellation composed of 100 or more satellites.

\* \* \* \* \*